US012533878B2

(12) United States Patent
Kondo

(10) Patent No.: US 12,533,878 B2
(45) Date of Patent: Jan. 27, 2026

(54) DRIVE CIRCUIT UNIT, HEAD UNIT, AND LIQUID DISCHARGE APPARATUS

(71) Applicant: SEIKO EPSON CORPORATION, Tokyo (JP)

(72) Inventor: Yoichiro Kondo, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 228 days.

(21) Appl. No.: 18/476,387

(22) Filed: Sep. 28, 2023

(65) Prior Publication Data

US 2024/0109296 A1 Apr. 4, 2024

(30) Foreign Application Priority Data

Sep. 30, 2022 (JP) ................................ 2022-157643

(51) Int. Cl.

| | |
|---|---|
| ***B41J 2/045*** | (2006.01) |
| ***B41J 29/377*** | (2006.01) |
| *B41J 2/14* | (2006.01) |
| *B41J 2/515* | (2006.01) |

(52) U.S. Cl.

CPC ....... *B41J 2/04541* (2013.01); *B41J 2/04581* (2013.01); *B41J 2/04588* (2013.01); *B41J 2/04593* (2013.01); *B41J 29/377* (2013.01); *B41J 2002/14491* (2013.01); *B41J 2/515* (2013.01); *B41J 2202/08* (2013.01)

(58) Field of Classification Search

CPC ................ B41J 2/04541; B41J 2/04581; B41J 2/04588; B41J 2/04515; B41J 29/377; B41J 2/155; B41J 2202/08; B41J 2002/14491

USPC .................................................. 347/5, 9, 10

See application file for complete search history.

(56) References Cited

U.S. PATENT DOCUMENTS 11,186,083 B2 11/2021 Kondo
2016/0297221 A1* 10/2016 Kitazawa ............... B41J 29/377
2017/0313109 A1* 11/2017 Profaca .................. B41J 25/006

FOREIGN PATENT DOCUMENTS

JP 2020-138356 A 9/2020

* cited by examiner

*Primary Examiner* — Leslie J Evanisko
*Assistant Examiner* — Thomas Ray Kneif
(74) *Attorney, Agent, or Firm* — Global IP Counselors, LLP

(57) ABSTRACT

Provided is a drive circuit unit generating a drive signal for driving a head, the drive circuit unit including: a drive circuit generating the drive signal; a first connector coupled to the head; a first substrate on which the first connector is mounted; a fan generating wind for the drive circuit; and a second substrate on which the fan is mounted.

8 Claims, 17 Drawing Sheets

| [SIH, SIL] | [1, 1] LD | [1, 0] SD | [0, 1] ND | [0, 0] BSD |
|---|---|---|---|---|
| S1 | H | L | L | L |
| S2 | L | H | L | L |
| S3 | L | L | L | H |

DRIVE CIRCUIT UNIT, HEAD UNIT, AND LIQUID DISCHARGE APPARATUS

The present application is based on, and claims priority from JP Application Serial Number 2022-157643, filed Sep. 30, 2022, the disclosure of which is hereby incorporated by reference herein in its entirety.

BACKGROUND

1. Technical Field

The present disclosure relates to a drive circuit unit, a head unit, and a liquid discharge apparatus.

2. Related Art

Research and development have been conducted on a liquid discharge apparatus that discharges a liquid onto a medium and forms an image on the medium.

In this regard, a liquid discharge apparatus that drives a piezoelectric element such as a piezo element with a signal from a drive circuit provided on a head has been known (see JP-A-2020-138356).

Here, the liquid discharge apparatus as disclosed in JP-A-2020-138356 supplies a drive signal to a piezoelectric element included in a head that discharges a liquid to drive the piezoelectric element, and discharges a liquid having an amount corresponding to the drive of the piezoelectric element. Therefore, the liquid discharge apparatus includes a drive circuit that generates a drive signal.

In such a liquid discharge apparatus, it is not uncommon that a substrate on which the drive circuit is mounted is disposed directly above the head. This is because the disposition of the substrate directly above the head leads to suppression of an increase in length of a transmission line through which a signal that is a base of image data is transmitted, so that reduction of discharge stability in response to an increase in inductance of the transmission line can be suppressed. In addition, in an attempt to increase versatility of the liquid discharge apparatus, it is not uncommon that the liquid discharge apparatus includes a line head configured of a plurality of heads. In this case, a direction of increasing a size of the substrate is limited by a distance between the heads, and tends to be a height direction. For this reason, as described above, in the liquid discharge apparatus, it is not uncommon that a substrate on which the drive circuit is mounted is disposed directly above the head.

Here, the drive circuit is configured of a heat-generating member such as an integrated circuit, an electric field effect transistor, and a coil. As a result, the drive circuit becomes hot during driving. It is not uncommon that a cooling fan is provided for each drive circuit in the liquid discharge apparatus as a method of efficiently cooling such a drive circuit. However, in this case, in the liquid discharge apparatus, vibration generated by rotation of the fan may be transmitted to the drive circuit, and as a result, a malfunction may occur.

SUMMARY

According to an aspect of the present disclosure, there is provided a drive circuit unit generating a drive signal for driving a head, the drive circuit unit including: a drive circuit generating the drive signal; a first connector coupled to the head; a first substrate on which the first connector is mounted; a fan generating wind for the drive circuit; and a second substrate on which the fan is mounted.

In addition, according to another aspect of the present disclosure, there is provided a head unit including: a head; and a drive circuit unit generating a drive signal for driving the head, in which the drive circuit unit includes a drive circuit generating the drive signal, a first connector coupled to the head, a first substrate on which the first connector is mounted, a fan generating wind for the drive circuit, and a second substrate on which the fan is mounted.

In addition, according to still another aspect of the present disclosure, there is provided a liquid discharge apparatus including: a transport unit transporting a medium; a head; and a drive circuit unit generating a drive signal for driving the head, in which the drive circuit unit includes a drive circuit generating the drive signal, a first connector coupled to the head, a first substrate on which the first connector is mounted, a fan generating wind for the drive circuit, and a second substrate on which the fan is mounted.

DESCRIPTION OF EMBODIMENTS

Hereinafter, preferred embodiments of the present disclosure will be described with reference to the drawings. The drawings used are for convenience of description. The embodiments described below do not unreasonably limit the content of the present disclosure described in the claims. In addition, not all of the configurations described below are essential components of the present disclosure.

1. First Embodiment

1.1 Configuration of Liquid Discharge Apparatus

Figure 1:
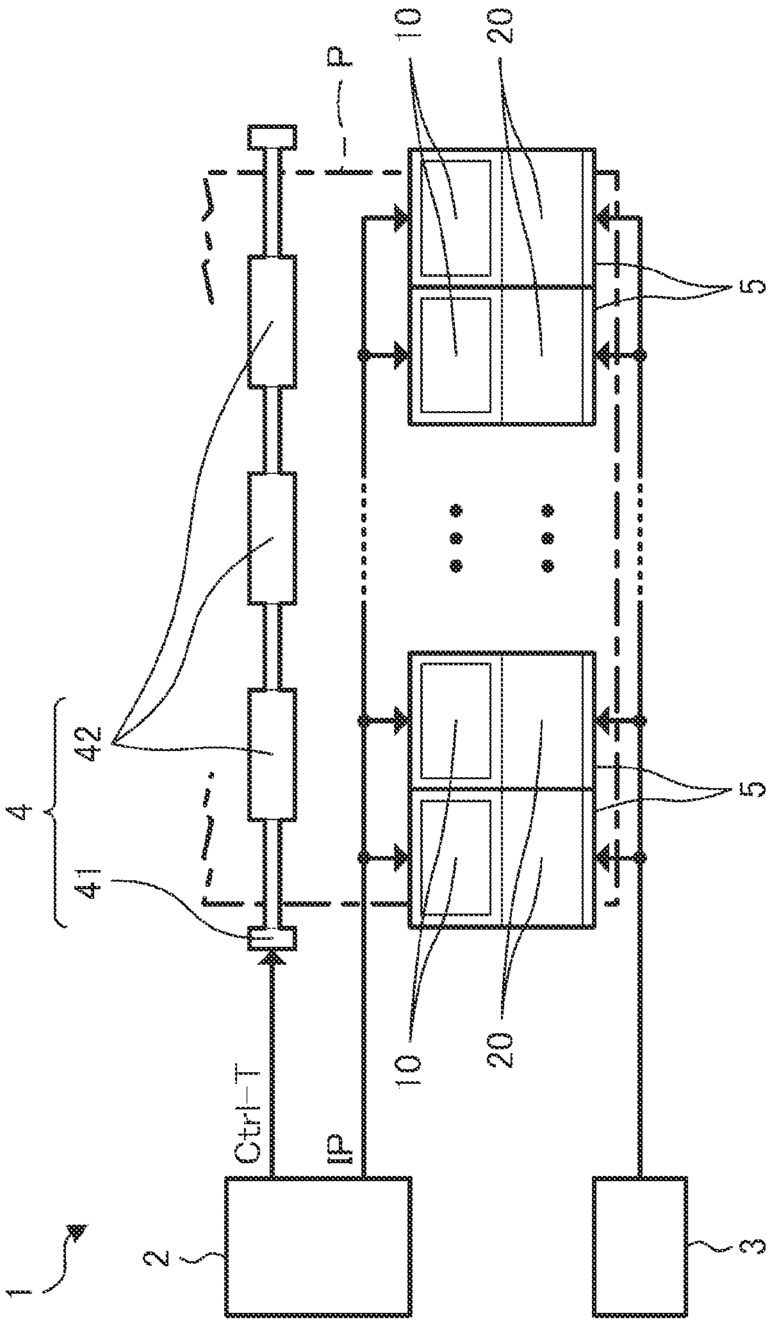
FIG. 1 is a diagram illustrating a schematic configuration of a liquid discharge apparatus.

FIG. 1 is a diagram illustrating a schematic configuration of a liquid discharge apparatus 1. As illustrated in FIG. 1, the liquid discharge apparatus 1 is a so-called line-type ink jet printer that forms a desired image on a medium P transported by a transport unit 4 by discharging an ink, which is an example of a liquid, to the medium P at a desired timing. Here, in the following description, a direction where the medium P is transported may be referred to as a transport direction, and a width direction of the transported medium P may be referred to as a main scanning direction.

As illustrated in FIG. 1, the liquid discharge apparatus 1 includes a control unit 2, a liquid container 3, a transport unit 4, and a plurality of discharge units 5.

The control unit 2 includes a processing circuit such as a central processing unit (CPU) and a field programmable gate array (FPGA), and a storage circuit such as a semiconductor memory. The control unit 2 outputs a signal for controlling each element of the liquid discharge apparatus 1 based on image data supplied from an external device such as a host computer (not illustrated) provided outside the liquid discharge apparatus 1.

The liquid container 3 stores one or a plurality of types of liquids to be supplied to the discharge unit 5. For example, the liquid container 3 stores an ink to be supplied to the discharge unit 5. Specifically, the liquid container 3 stores inks of a plurality of colors to be discharged to the medium P, such as black, cyan, magenta, yellow, red, and gray. Of course, the liquid container 3 may store only the black ink or may store a liquid other than the ink.

The transport unit 4 includes a transport motor 41 and a transport roller 42. A transport control signal Ctrl-T output by the control unit 2 is input to the transport unit 4. The transport motor 41 operates based on the input transport control signal Ctrl-T, and the transport roller 42 is rotationally driven along with the operation of the transport motor 41, so that the medium P is transported along the transport direction.

Each of the plurality of discharge units 5 includes a head drive module 10 and a liquid discharge module 20. An image information signal IP output by the control unit 2 is input to the discharge unit 5, and the ink stored in the liquid container 3 is supplied to the discharge unit 5. The head drive module 10 controls an operation of the liquid discharge module 20 based on the image information signal IP input from the control unit 2, and the liquid discharge module 20 discharges the ink supplied from the liquid container 3 to the medium P according to the control of the head drive module 10.

In addition, the liquid discharge modules 20 included in each of the plurality of discharge units 5 are located side by side along the main scanning direction so as to be equal to or wider than a width of the medium P such that the ink can be discharged to the entire region in the width direction of the transported medium P. As a result, the liquid discharge apparatus 1 constitutes a line-type ink jet printer. The liquid discharge apparatus 1 is not limited to the line-type ink jet printer.

Figure 2:
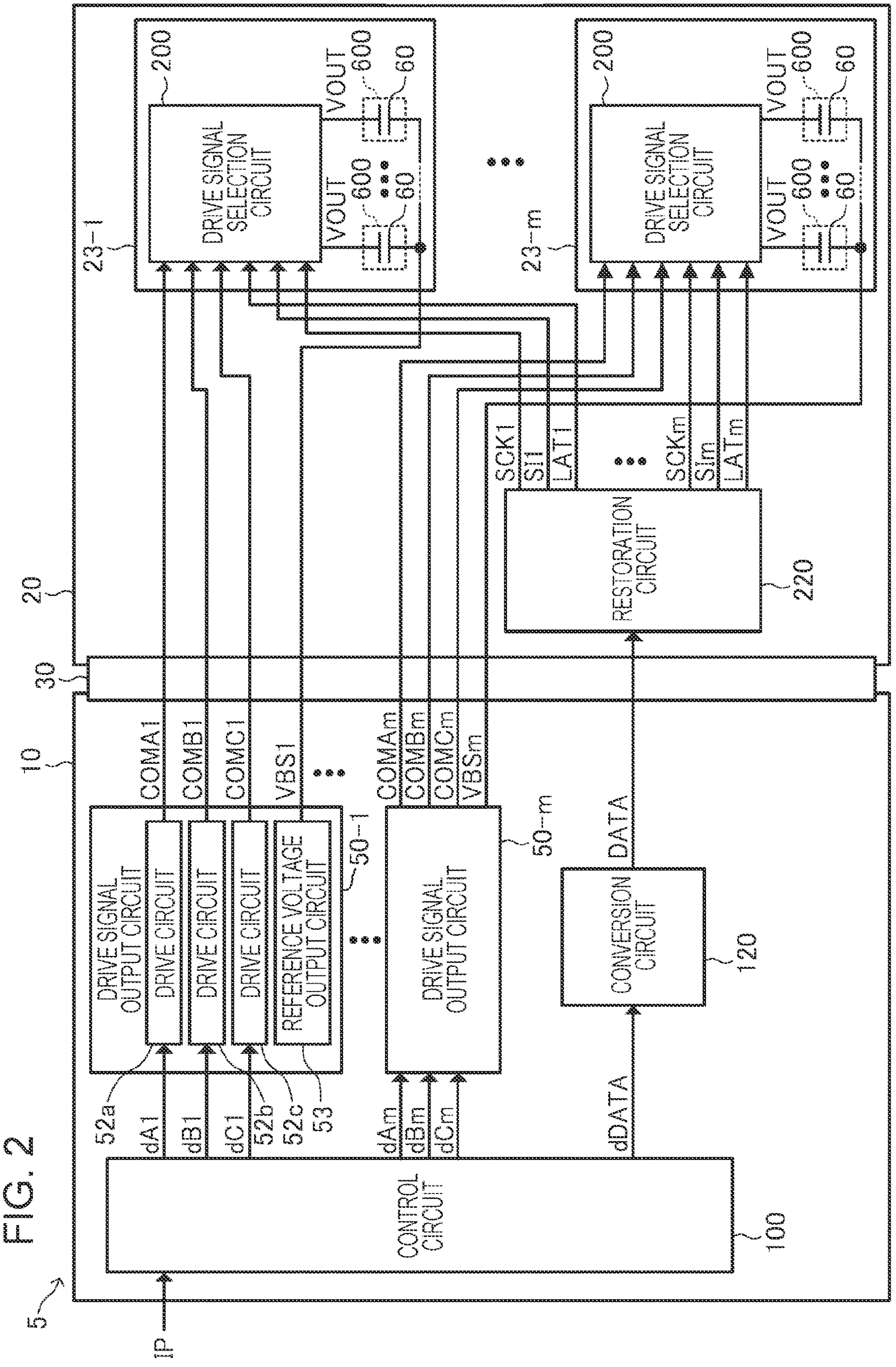
FIG. 2 is a diagram illustrating a schematic configuration of a discharge unit.

Next, a schematic configuration of the discharge unit 5 will be described. FIG. 2 is a diagram illustrating a schematic configuration of the discharge unit 5. As illustrated in FIG. 2, the discharge unit 5 includes the head drive module 10 and the liquid discharge module 20. In addition, in the discharge unit 5, the head drive module 10 and the liquid discharge module 20 are electrically coupled by one or a plurality of wiring members 30.

The wiring member 30 is a flexible member for electrically coupling the head drive module 10 and the liquid discharge module 20, such as flexible printed circuits (FPC).

The head drive module 10 includes a control circuit 100, drive signal output circuits 50-1 to 50-*m*, and a conversion circuit 120.

The control circuit 100 includes a CPU, FPGA, or the like. The image information signal IP output by the control unit 2 is input to the control circuit 100. The control circuit 100 outputs a signal for controlling each element of the discharge unit 5 based on the input image information signal IP.

The control circuit 100 generates a basic data signal dDATA for controlling the operation of the liquid discharge module 20 based on the image information signal IP, and outputs the basic data signal dDATA to the conversion circuit 120. The conversion circuit 120 converts the basic data signal dDATA into a differential signal such as low voltage differential signaling (LVDS), and outputs the differential signal to the liquid discharge module 20 as a data signal DATA. The conversion circuit 120 may convert the basic data signal dDATA into a differential signal of a high-speed transfer method such as low voltage positive emitter coupled logic (LVPECL) or current mode logic (CML) other than the LVDS, and output the differential signal to the liquid discharge module 20 as the data signal DATA, or may output a part or all of the basic data signal dDATA to the liquid discharge module 20 as a single-ended data signal DATA.

In addition, the control circuit 100 outputs basic drive signals dA1, dB1, and dC1 to the drive signal output circuit 50-1. The drive signal output circuit 50-1 includes drive circuits 52*a*, 52*b*, and 52*c*. The basic drive signal dA1 is input to the drive circuit 52*a*. The drive circuit 52*a* generates a drive signal COMA1 by performing digital/analog conversion of the input basic drive signal dA1 and then performing amplification in class D, and outputs the drive signal COMA1 to the liquid discharge module 20. The basic drive signal dB1 is input to the drive circuit 52*b*. The drive circuit 52*b* generates a drive signal COMB1 by performing digital/analog conversion of the input basic drive signal dB1 and then performing amplification in class D, and outputs the drive signal COMB1 to the liquid discharge module 20. The basic drive signal dC1 is input to the drive circuit 52*c*. The drive circuit 52*c* generates a drive signal COMC1 by performing digital/analog conversion of the input basic drive signal dC1 and then performing amplification in class D, and outputs the drive signal COMC1 to the liquid discharge module 20.

Here, the drive circuits 52*a*, 52*b*, and 52*c* need only to be able to generate the drive signals COMA1, COMB1, and COMC1 by amplifying waveforms defined by the input basic drive signals dA1, dB1, and dC1, respectively, and may include a class A amplifier circuit, a class B amplifier circuit, an AB amplifier circuit, or the like instead of a class D amplifier circuit or in addition to the class D amplifier circuit. In addition, the basic drive signals dA1, dB1, and dC1 need only to be able to define the waveforms of the corresponding drive signals COMA1, COMB1, and COMC1, respectively, and may be an analog signal.

In addition, the drive signal output circuit 50-1 includes a reference voltage output circuit 53. The reference voltage output circuit 53 generates a reference voltage signal VBS1 having a constant potential indicating a reference potential of a piezoelectric element 60, which will be described below, included in the liquid discharge module 20, and outputs the reference voltage signal VBS1 to the liquid discharge module 20. The reference voltage signal VBS1 may be, for example, a ground potential or a constant potential such as 5.5 V or 6 V. Here, the constant potential includes a case where it can be regarded as a substantially constant potential when a fluctuation due to an error, such as a fluctuation of the potential caused by an operation of a peripheral circuit, a fluctuation of the potential caused by variations in a circuit element, and a fluctuation of the potential caused by temperature characteristics of the circuit element, is taken into consideration.

The drive signal output circuits 50-2 to 50-*m* have the same configuration as the drive signal output circuit 50-1, except that the input signal and the output signal are different. That is, a drive signal output circuit 50-*j* (j is any one of 1 to m) includes circuits corresponding to the drive circuits 52*a*, 52*b*, and 52*c* and a circuit corresponding to the reference voltage output circuit 53, generates drive signals COMAj, COMBj, and COMCj based on basic drive signals dAj, dBj, and dCj input from the control circuit 100 and a reference voltage signal VBSj, and outputs the drive signals and the reference voltage signal to the liquid discharge module 20.

Here, in the following description, the drive circuits 52*a*, 52*b*, and 52*c* included in the drive signal output circuit 50-1 and the drive circuits 52*a*, 52*b*, and 52*c* included in the drive signal output circuit 50-*j* have the same configuration, and may be simply referred to as a drive circuit 52 when it is not necessary to distinguish the drive circuits. In this case, the drive circuit 52 will be described as generating and outputting a drive signal COM based on the basic drive signal do. On the other hand, when distinguishing between the drive circuits 52*a*, 52*b*, and 52*c* included in the drive signal output circuit 50-1 and the drive circuits 52*a*, 52*b*, and 52*c* included in the drive signal output circuit 50-*j*, the drive circuits 52*a*, 52*b*, and 52*c* included in the drive signal output circuit 50-1 may be referred to as drive circuits 52*a*1, 52*b*1, and 52*c*1, and the drive circuits 52*a*, 52*b*, and 52*c* included in the drive signal output circuit 50-*j* may be referred to as drive circuits 52*aj*, 52*bj*, and 52*cj*.

The liquid discharge module 20 includes a restoration circuit 220 and discharge modules 23-1 to 23-*m*.

The restoration circuit 220 restores the data signal DATA to a single-ended signal, separates the data signal DATA into signals corresponding to the discharge modules 23-1 to 23-*m*, and outputs the separated signals to the corresponding discharge modules 23-1 to 23-*m*.

Specifically, the restoration circuit 220 restores and separates the data signal DATA to generate a clock signal SCK1, a print data signal SI1, and a latch signal LAT1 corresponding to the discharge module 23-1, and outputs these signals to the discharge module 23-1. In addition, the restoration circuit 220 restores and separates the data signal DATA to generate a clock signal SCKj, a print data signal SIj, and a latch signal LATj corresponding to a discharge module 23-*j*, and outputs these signals to a discharge module 23-*j*.

As described above, the restoration circuit 220 restores the data signal DATA as the differential signal output by the head drive module 10, and separates the restored signal into the signals corresponding to the discharge modules 23-1 to 23-*m*. As a result, the restoration circuit 220 generates clock signals SCK1 to SCKm, print data signals SI1 to SIm, and latch signals LAT1 to LATm corresponding to the discharge modules 23-1 to 23-*m*, and outputs these signals to the corresponding discharge modules 23-1 to 23-*m*. Any one of the clock signals SCK1 to SCKm, the print data signals SI1 to SIm, and the latch signals LAT1 to LATm corresponding to the discharge modules 23-1 to 23-*m*, which are output by the restoration circuit 220, may be a common signal for the discharge modules 23-1 to 23-*m*.

Here, in view of the fact that the restoration circuit 220 generates the clock signals SCK1 to SCKm, the print data signals SI1 to SIm, and the latch signals LAT1 to LATm by restoring and separating the data signal DATA, the data signal DATA output by the control circuit 100 is a differential signal corresponding to the clock signals SCK1 to SCKm, the print data signals SI1 to SIm, and the latch signals LAT1 to LATm, and the basic data signal dDATA on which the data signal DATA is based includes signals corresponding to the clock signals SCK1 to SCKm, the print data signals SI1 to SIm, and the latch signals LAT1 to LATm. That is, the basic data signal dDATA includes signals for controlling operations of the discharge modules 23-1 to 23-*m* included in the liquid discharge module 20.

The discharge module 23-1 includes a drive signal selection circuit 200 and a plurality of discharge sections 600. In addition, each of the plurality of discharge sections 600 includes a piezoelectric element 60.

The drive signals COMA1, COMB1, and COMC1, the reference voltage signal VBS1, the clock signal SCK1, the print data signal SI1, and the latch signal LAT1 are input to the discharge module 23-1. The drive signals COMA1, COMB1, and COMC1, the clock signal SCK1, the print data signal SI1, and the latch signal LAT1 are input to the drive signal selection circuit 200 included in the discharge module 23-1. The drive signal selection circuit 200 generates a drive signal VOUT by selecting or not selecting each of the drive signals COMA1, COMB1, and COMC1 based on the input clock signal SCK1, print data signal SI1, and latch signal LAT1, and supplies the drive signal VOUT to one end of the piezoelectric element 60 included in the corresponding discharge section 600. At this time, the reference voltage signal VBS1 is supplied to the other end of the piezoelectric element 60. The piezoelectric element 60 is driven by a potential difference between the drive signal VOUT supplied to the one end and the reference voltage signal VBS1 supplied to the other end, so that an ink is discharged from the corresponding discharge section 600.

Similarly, the discharge module 23-*j* includes a drive signal selection circuit 200 and a plurality of discharge sections 600. In addition, each of the plurality of discharge sections 600 includes a piezoelectric element 60.

The drive signals COMAj, COMBj, and COMCj, the reference voltage signal VBSj, the clock signal SCKj, the print data signal SIj, and the latch signal LATj are input to the discharge module 23-*j*. The drive signals COMAj, COMBj, and COMCj, the clock signal SCKj, the print data signal SIj, and the latch signal LATj are input to the drive signal selection circuit 200 included in the discharge module 23-*j*. The drive signal selection circuit 200 generates a drive signal VOUT by selecting or not selecting each of the drive signals COMAj, COMBj, and COMCj based on the input clock signal SCKj, print data signal SIj, and latch signal LATj, and supplies the drive signal VOUT to one end of the piezoelectric element 60 included in the corresponding discharge section 600. At this time, the reference voltage signal VBSj is supplied to the other end of the piezoelectric element 60. The piezoelectric element 60 is driven by a potential difference between the drive signal VOUT supplied to the one end and the reference voltage signal VBSj supplied to the other end, so that an ink is discharged from the corresponding discharge section 600.

In the liquid discharge apparatus 1 of the first embodiment configured as described above, the control unit 2 controls the transport of the medium P by the transport unit 4, and controls the discharge of the ink from the liquid discharge module 20 included in the discharge unit 5, based on the image data supplied from a host computer or the like (not illustrated). As a result, the liquid discharge apparatus 1 can land a desired amount of ink at a desired position on the medium P, and forms a desired image on the medium P.

Here, the discharge modules 23-1 to 23-*m* included in the liquid discharge module 20 have the same configuration except that the input signals are different. Therefore, in the following description, when it is not necessary to distinguish the discharge modules 23-1 to 23-*m*, the discharge modules 23-1 to 23-*m* may be simply referred to as a discharge module 23. In addition, in this case, the drive signals COMA1 to COMAm input to the discharge module 23 may be referred to as a drive signal COMA, the drive signals COMB1 to COMBm input to the discharge module 23 may be referred to as a drive signal COMB, the drive signals COMC1 to COMCm input to the discharge module 23 may be referred to as a drive signal COMC, the reference voltage signals VBS1 to VBSm input to the discharge module 23 may be referred to as a reference voltage signal VBS, the clock signals SCK1 to SCKm input to the discharge module 23 may be referred to as a clock signal SCK, the print data signals SI1 to SIm input to the discharge module 23 may be referred to as a print data signal SI, and the latch signals LAT1 to LATm input to the discharge module 23 may be referred to as a latch signal LAT.

That is, the drive signals COMA, COMB, and COMC, the reference voltage signal VBS, the clock signal SCK, the print data signal SI, and the latch signal LAT are input to the discharge module 23. The drive signals COMA, COMB, and COMC, the clock signal SCK, the print data signal SI, and the latch signal LAT are input to the drive signal selection circuit 200 included in the discharge module 23. The drive signal selection circuit 200 generates a drive signal VOUT by selecting or not selecting each of the drive signals COMA, COMB, and COMC based on the input clock signal SCK, print data signal SI, and latch signal LAT, and supplies the drive signal VOUT to one end of the piezoelectric element 60 included in the corresponding discharge section 600. At this time, the reference voltage signal VBS is supplied to the other end of the piezoelectric element 60. The piezoelectric element 60 is driven by a potential difference between the drive signal VOUT supplied to the one end and the reference voltage signal VBSj supplied to the other end, so that an ink is discharged from the corresponding discharge section 600.

As described above, the liquid discharge apparatus 1 in the present embodiment includes the liquid discharge module 20 that includes the discharge module 23 discharging an ink in response to the drive of the piezoelectric element 60, the head drive module 10 that includes the drive signal output circuits 50-1 to 50-*m* outputting the drive signals COMA, COMB, and COMC, and the wiring member 30 whose one end is electrically coupled to the head drive module 10 and the other end is electrically coupled to the liquid discharge module 20. Here, the piezoelectric element 60 is an example of a drive element, the discharge module 23 discharging an ink in response to the drive of the piezoelectric element 60 or the liquid discharge module 20 including the discharge module 23 is an example of a discharge head, and any of the drive signal output circuits 50-1 to 50-*m* outputting the drive signals COMA, COMB, and COMC or the head drive module 10 including the drive signal output circuits 50-1 to 50-*m* is an example of a head drive circuit.

1.2 Functional Configuration of Drive Signal Selection Circuit

Next, a configuration and operation of the drive signal selection circuit 200 included in the discharge module 23 will be described. In describing the configuration and operation of the drive signal selection circuit 200 included in the discharge module 23, first, an example of signal waveforms included in the drive signals COMA, COMB, and COMC input to the drive signal selection circuit 200 will be described.

Figure 3:
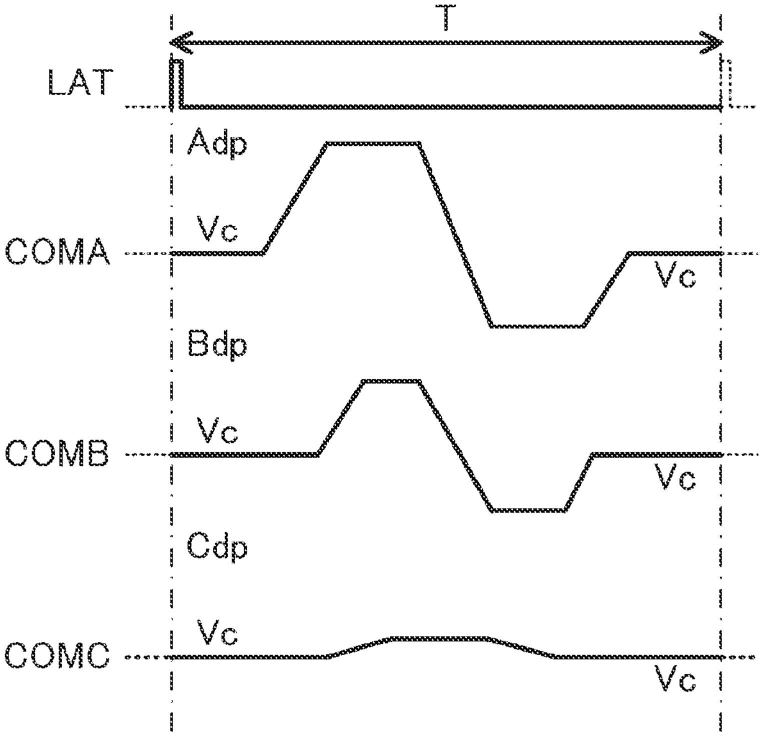
FIG. 3 is a graph illustrating an example of signal waveforms of drive signals.

FIG. 3 is a diagram illustrating an example of the signal waveforms of the drive signals COMA, COMB, and COMC. As illustrated in FIG. 3, the drive signal COMA includes a trapezoidal waveform Adp arranged in a cycle T from the rise of the latch signal LAT to the next rise of the latch signal LAT. The trapezoidal waveform Adp is a signal waveform that is supplied to one end of the piezoelectric element 60 to discharge a predetermined amount of ink from the discharge section 600 corresponding to the piezoelectric element 60. The drive signal COMB includes a trapezoidal waveform Bdp arranged in the cycle T. This trapezoidal waveform Bdp is a signal waveform whose voltage amplitude is smaller than that of the trapezoidal waveform Adp, and is a signal waveform that is supplied to one end of the piezoelectric element 60 to discharge a smaller amount of ink than a predetermined amount from the discharge section 600 corresponding to the piezoelectric element 60. The drive signal COMC includes a trapezoidal waveform Cdp arranged in the cycle T. This trapezoidal waveform Cdp is a signal waveform whose voltage amplitude is smaller than that of the trapezoidal waveforms Adp and Bdp, and is a signal waveform that is supplied to one end of the piezoelectric element 60 to vibrate the ink in the vicinity of a nozzle opening portion to the extent that the ink is not discharged from the discharge section 600 corresponding to the piezoelectric element 60. The trapezoidal waveform Cdp is supplied to the piezoelectric element 60 to vibrate the ink in the vicinity of the nozzle opening portion of the discharge section 600 including the piezoelectric element 60. As a result, a possibility of increasing a viscosity of the ink in the vicinity of the nozzle opening portion is reduced.

That is, the drive signal COMA is a signal for driving the piezoelectric element 60 so that the ink is discharged, the drive signal COMB is a signal for driving the piezoelectric element 60 so that the ink is discharged, and the drive signal COMC is a signal for driving the piezoelectric element 60 so that the ink is not discharged. An amount of the ink discharged from the liquid discharge module 20 including the discharge module 23 when such a drive signal COMA is supplied to the piezoelectric element 60 is different from an amount of the ink discharged from the liquid discharge module 20 including the discharge module 23 when such a drive signal COMB is supplied to the piezoelectric element 60.

In addition, at a start timing and at an end timing of each of the trapezoidal waveforms Adp, Bdp, and Cdp, all of voltage values of the trapezoidal waveforms Adp, Bdp, and Cdp are a voltage Vc in common. That is, each of the trapezoidal waveforms Adp, Bdp, and Cdp is a signal waveform that starts at the voltage Vc and ends at the voltage Vc.

Here, in the following description, when the trapezoidal waveform Adp is supplied to one end of the piezoelectric element 60, the amount of the ink discharged from the discharge section 600 corresponding to the piezoelectric element 60 may be referred to as a large amount, and, when the trapezoidal waveform Bdp is supplied to one end of the piezoelectric element 60, the amount of the ink discharged from the discharge section 600 corresponding to the piezoelectric element 60 may be referred to as a small amount. In addition, when the trapezoidal waveform Cdp is supplied to one end of the piezoelectric element 60, vibrating the ink in the vicinity of the nozzle opening portion to the extent that the ink is not discharged from the discharge section 600 corresponding to the piezoelectric element 60 may be referred to as micro-vibration.

Although FIG. 3 illustrates a case where each of the drive signals COMA, COMB, and COMC includes one trapezoidal waveform in the cycle T, each of the drive signals COMA, COMB, and COMC may include two or more consecutive trapezoidal waveforms in the cycle T. In this case, a signal defining a switching timing of two or more trapezoidal waveforms is input to the drive signal selection circuit 200, and the discharge section 600 discharges the ink a plurality of times in the cycle T. The ink discharged in the plurality of times in the cycle T lands on the medium P and is combined to form one dot on the medium P. As a result, the number of gradations of dots formed on the medium P can be increased.

On the other hand, in the liquid discharge apparatus 1 described in the first embodiment, the description is made on the assumption that the drive signals COMA, COMB, and COMC are signals including one trapezoidal waveform in the cycle T. As a result, the cycle T for forming dots on the medium P can be shortened, a speed of image formation on the medium P can be increased. In addition, the drive signals COMA, COMB, and COMC are supplied to the liquid discharge module 20 in parallel, so that the number of gradations of dots formed on the medium P is also increased. Here, the cycle T from the rise of the latch signal LAT to the next rise of the latch signal LAT may be referred to as a dot formation cycle for forming dots with a desired size on the medium P.

The signal waveforms included in the drive signals COMA, COMB, and COMC are not limited to the signal waveforms exemplified in FIG. 3, and various signal waveforms may be used depending on a type of the ink discharged from the discharge section 600, the number of the piezoelectric elements 60 driven by the drive signals COMA, COMB, and COMC, a length of a wiring through which the drive signals COMA, COMB, and COMC are propagated, and the like. That is, the drive signals COMA1 to COMAm illustrated in FIG. 2 may include signal waveforms different from each other, and similarly, the drive signals COMB1 to COMBm and the drive signals COMC1 to COMCm may include signal waveforms different from each other.

Figure 4:
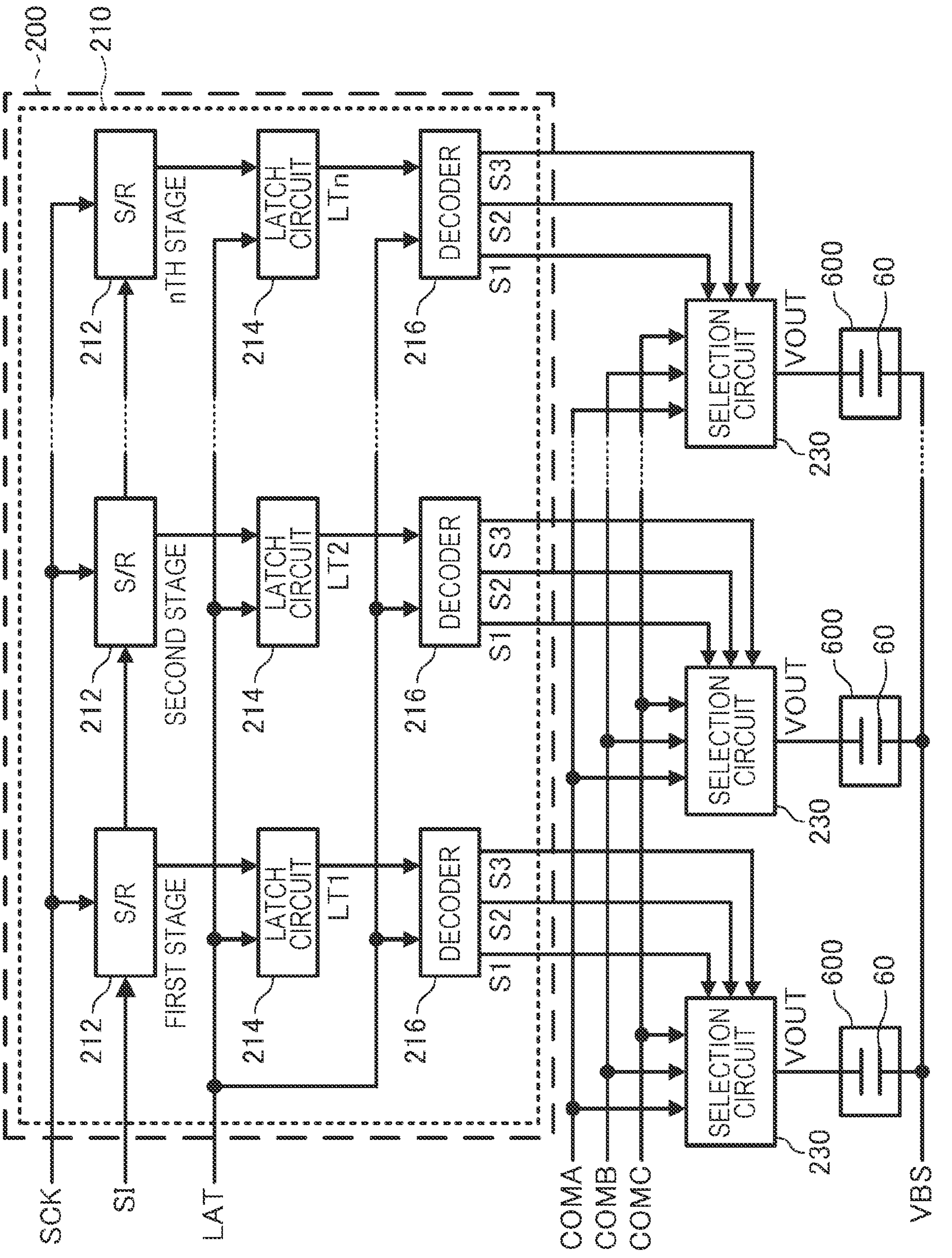
FIG. 4 is a diagram illustrating a functional configuration of a drive signal selection circuit.

Next, a configuration and operation of the drive signal selection circuit 200 that outputs the drive signal VOUT by selecting or not selecting each of the drive signals COMA, COMB, and COMC will be described. FIG. 4 is a diagram illustrating a functional configuration of the drive signal selection circuit 200. As illustrated in FIG. 4, the drive signal selection circuit 200 includes a selection control circuit 210 and a plurality of selection circuits 230.

The print data signal SI, the latch signal LAT, and the clock signal SCK are input to the selection control circuit 210. In addition, the selection control circuit 210 includes a set of a shift register (S/R) 212, a latch circuit 214, and a decoder 216 corresponding to each of n discharge sections 600. That is, the drive signal selection circuit 200 includes n shift registers 212, n latch circuits 214, and n decoders 216, each of which is the same as the total number of discharge sections 600.

The print data signal SI is a signal synchronized with the clock signal SCK, and includes 2-bit print data [SIH, SIL] for defining the dot size formed by the ink discharged from each of the n discharge sections 600 as any of “large dot LD”, “small dot SD”, “non-discharge ND”, and “micro-vibration BSD”. This print data signal SI is held in the shift register 212 corresponding to the discharge section 600 for each 2-bit print data [SIH, SIL].

Specifically, the n shift registers 212 corresponding to the discharge sections 600 are cascade-coupled to each other. The print data signal SI that is serially input is sequentially transferred to a subsequent stage of the shift register 212 cascade-coupled according to the clock signal SCK. When the supply of the clock signal SCK is stopped, the n shift registers 212 holds the 2-bit print data [SIH, SIL] corresponding to the discharge section 600 corresponding to the shift register 212. In FIG. 4, in order to distinguish the n cascade-coupled shift registers 212, the shift registers 212 are denoted by as first stage, second stage, . . . , nth stage from the upstream to the downstream where the print data signal SI is input.

Each of the n latch circuits 214 latches simultaneously the 2-bit print data [SIH, SIL] held by the corresponding shift register 212 at the rise of the latch signal LAT.

Figures 5, 6:
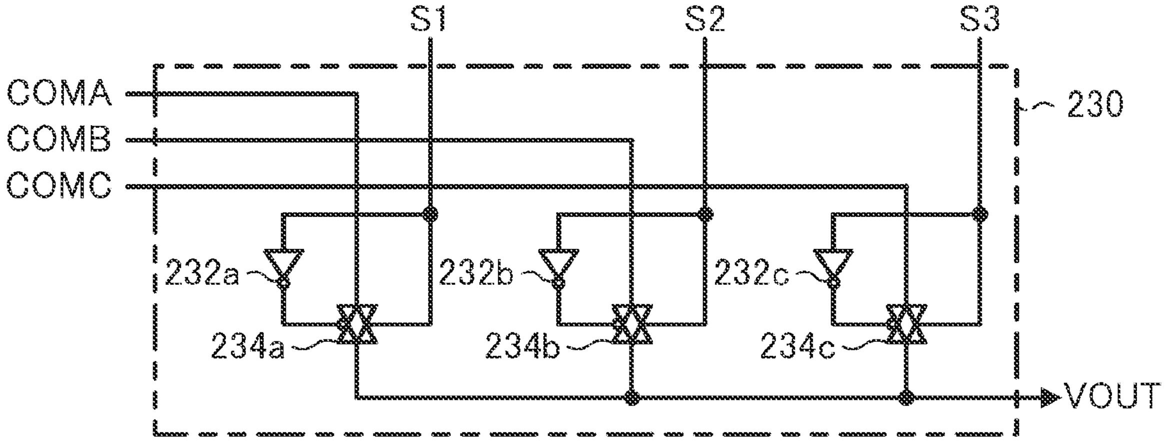
FIG. 5 is a table illustrating an example of a decoding content in a decoder.
FIG. 6 is a diagram illustrating an example of a configuration of a selection circuit.

Each of the n decoders 216 decodes the 2-bit print data [SIH, SIL] latched by the corresponding latch circuit 214, and outputs logic level selection signals S1, S2, and S3 according to the decoding content for each cycle T. FIG. 5 is a table illustrating an example of the decoding content in the decoder 216. The decoder 216 outputs the logic level selection signals S1, S2, and S3 defined by the latched 2-bit print data [SIH, SIL] and the decoding content illustrated in FIG. 5. For example, when the 2-bit print data [SIH, SIL] latched by the corresponding latch circuit 214 is [1, 0], the decoder 216 according to the first embodiment sets the logic levels of the selection signals S1, S2, and S3 to L, H, and L levels, respectively, in the cycle T.

The selection circuit 230 is provided corresponding to each of the n discharge sections 600. That is, the drive signal selection circuit 200 includes n selection circuits 230. The selection signals S1, S2, and S3 output by the decoder 216 corresponding to the same discharge section 600 and the drive signals COMA, COMB, and COMC are input to the selection circuit 230. The selection circuit 230 generates a drive signal VOUT by selecting or not selecting each of the drive signals COMA, COMB, and COMC based on the selection signals S1, S2, and S3 and the drive signals COMA, COMB, and COMC, and outputs the drive signal VOUT to the corresponding discharge section 600.

FIG. 6 is a diagram illustrating an example of a configuration of the selection circuit 230 corresponding to one discharge section 600. As illustrated in FIG. 6, the selection circuit 230 includes inverters 232*a*, 232*b*, and 232*c* and transfer gates 234*a*, 234*b*, and 234*c*.

The selection signal S1 is input to a positive control end not marked with a circle at the transfer gate 234*a*, while being logically inverted by the inverter 232*a* and input to a negative control end marked with a circle at the transfer gate 234*a*. In addition, the drive signal COMA is supplied to an input terminal of the transfer gate 234*a*. The transfer gate 234*a* is conductive between the input terminal and an output terminal when the input selection signal S1 is H level, and is non-conductive between the input terminal and the output terminal when the input selection signal S1 is L level. That is, the transfer gate 234*a* outputs the drive signal COMA to the output terminal when the selection signal S1 is H level, and does not output the drive signal COMA to the output terminal when the selection signal S1 is L level.

The selection signal S2 is input to a positive control end not marked with a circle at the transfer gate 234*b*, while being logically inverted by the inverter 232*b* and input to a negative control end marked with a circle at the transfer gate 234*b*. In addition, the drive signal COMB is supplied to an input terminal of the transfer gate 234*b*. The transfer gate 234*b* is conductive between the input terminal and an output terminal when the input selection signal S2 is H level, and is non-conductive between the input terminal and the output terminal when the input selection signal S2 is L level. That is, the transfer gate 234*b* outputs the drive signal COMB to the output terminal when the selection signal S2 is H level, and does not output the drive signal COMB to the output terminal when the selection signal S2 is L level.

The selection signal S3 is input to a positive control end not marked with a circle at the transfer gate 234*c*, while being logically inverted by the inverter 232*c* and input to a negative control end marked with a circle at the transfer gate 234*c*. In addition, the drive signal COMC is supplied to an input terminal of the transfer gate 234*c*. The transfer gate 234*c* is conductive between the input terminal and an output terminal when the input selection signal S3 is H level, and is non-conductive between the input terminal and the output terminal when the input selection signal S3 is L level. That is, the transfer gate 234*c* outputs the drive signal COMC to the output terminal when the selection signal S3 is H level, and does not output the drive signal COMC to the output terminal when the selection signal S3 is L level.

The output terminals of the transfer gates 234*a*, 234*b*, and 234*c* are commonly coupled. That is, the drive signals COMA, COMB, and COMC selected or not selected based on the selection signals S1, S2, and S3 are supplied to the output terminals of the transfer gates 234*a*, 234*b*, and 234*c* commonly coupled. The selection circuit 230 outputs the signal supplied to the commonly coupled output terminals to the corresponding discharge section 600 as the drive signal VOUT.

Figure 7:
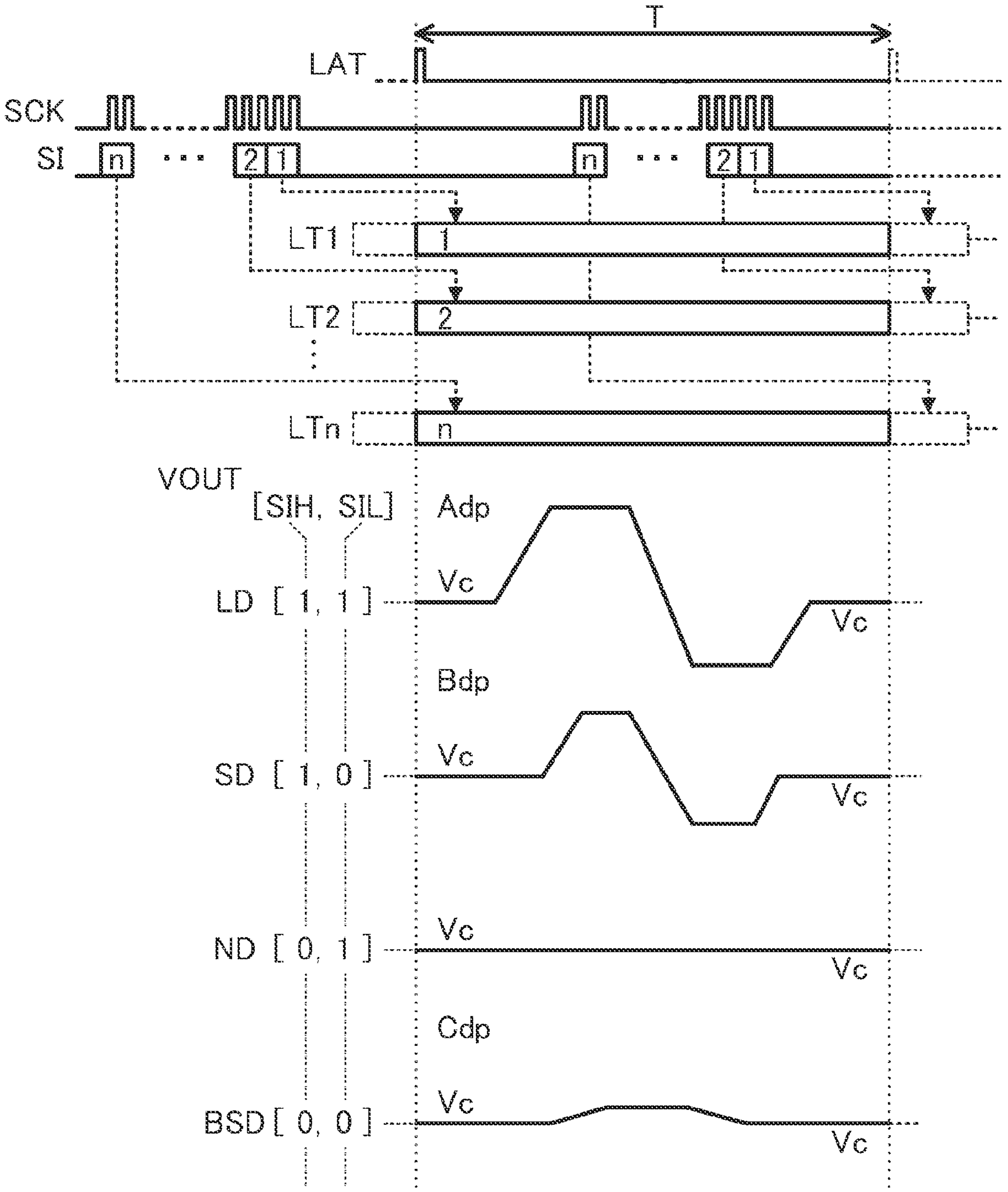
FIG. 7 is a diagram for describing an operation of the drive signal selection circuit.

An operation of the drive signal selection circuit 200 will be described. FIG. 7 is a diagram for describing the operation of the drive signal selection circuit 200.

The print data signal SI is serially input in synchronization with the clock signal SCK, and is sequentially transferred by the shift register 212 corresponding to the discharge section 600. When the input of the clock signal SCK is stopped, the 2-bit print data [SIH, SIL] corresponding to each of the discharge sections 600 is held in the corresponding shift register 212.

Thereafter, when the latch signal LAT rises, the 2-bit print data [SIH, SIL] held in the shift register 212 are simultaneously latched by the latch circuit 214. In FIG. 7, the 2-bit print data [SIH, SIL], which are latched by the latch circuit 214, corresponding to first stage, second stage, . . . , nth stage shift registers 212 are illustrated as LT1, LT2, . . . , LTn.

The decoder 216 outputs the logic level selection signals S1, S2, and S3 according to the dot size defined by the latched 2-bit print data [SIH, SIL].

Specifically, when the print data [SIH, SIL] is [1, 1], the decoder 216 outputs the logic levels of the selection signals S1, S2, and S3 as H, L, and L levels, respectively, to the selection circuit 230 in the cycle T. As a result, the selection circuit 230 selects the trapezoidal waveform Adp in the cycle T, and outputs the drive signal VOUT corresponding to the "large dot LD". In addition, when the print data [SIH, SIL] is [1, 0], the decoder 216 outputs the logic levels of the selection signals S1, S2, and S3 as L, H, and L levels, respectively, to the selection circuit 230 in the cycle T. As a result, the selection circuit 230 selects the trapezoidal waveform Bdp in the cycle T, and outputs the drive signal VOUT corresponding to the "small dot SD". In addition, when the print data [SIH, SIL] is [0, 1], the decoder 216 outputs the logic levels of the selection signals S1, S2, and S3 as L, L, and L levels, respectively, to the selection circuit 230 in the cycle T. As a result, the selection circuit 230 selects none of the trapezoidal waveforms Adp, Bdp, and Cdp in the cycle T, and outputs the drive signal VOUT corresponding to a constant "non-discharge ND" at the voltage Vc. In addition, when the print data [SIH, SIL] is [0, 0], the decoder 216 outputs the logic levels of the selection signals S1, S2, and S3 as L, L, and H levels, respectively, to the selection circuit 230 in the cycle T. As a result, the selection circuit 230 selects the trapezoidal waveform Cdp in the cycle T, and outputs the drive signal VOUT corresponding to the "micro-vibration BSD".

Here, when the selection circuit 230 selects none of the trapezoidal waveforms Adp, Bdp, and Cdp, at one end of the corresponding piezoelectric element 60, the voltage Vc supplied immediately before to the piezoelectric element 60 is held by a capacitive component of the piezoelectric element 60. That is, the fact that the selection circuit 230 outputs a constant drive signal VOUT at the voltage Vc includes a case where the immediately-before voltage Vc held by the capacitive component of the piezoelectric element 60 is supplied to the piezoelectric element 60 as the drive signal VOUT, when none of the trapezoidal waveforms Adp, Bdp, and Cdp is selected as the drive signal VOUT.

As described above, the drive signal selection circuit 200 generates a drive signal VOUT corresponding to each of the plurality of discharge sections 600 by selecting or not selecting the drive signals COMA, COMB, and COMC based on the print data signal SI, the latch signal LAT, and the clock signal SCK, and outputs the drive signal VOUT to the corresponding discharge section 600. As a result, the amount of the ink discharged from each of the plurality of discharge sections 600 is individually controlled.

1.3 Configuration of Liquid Discharge Module

Figure 8:
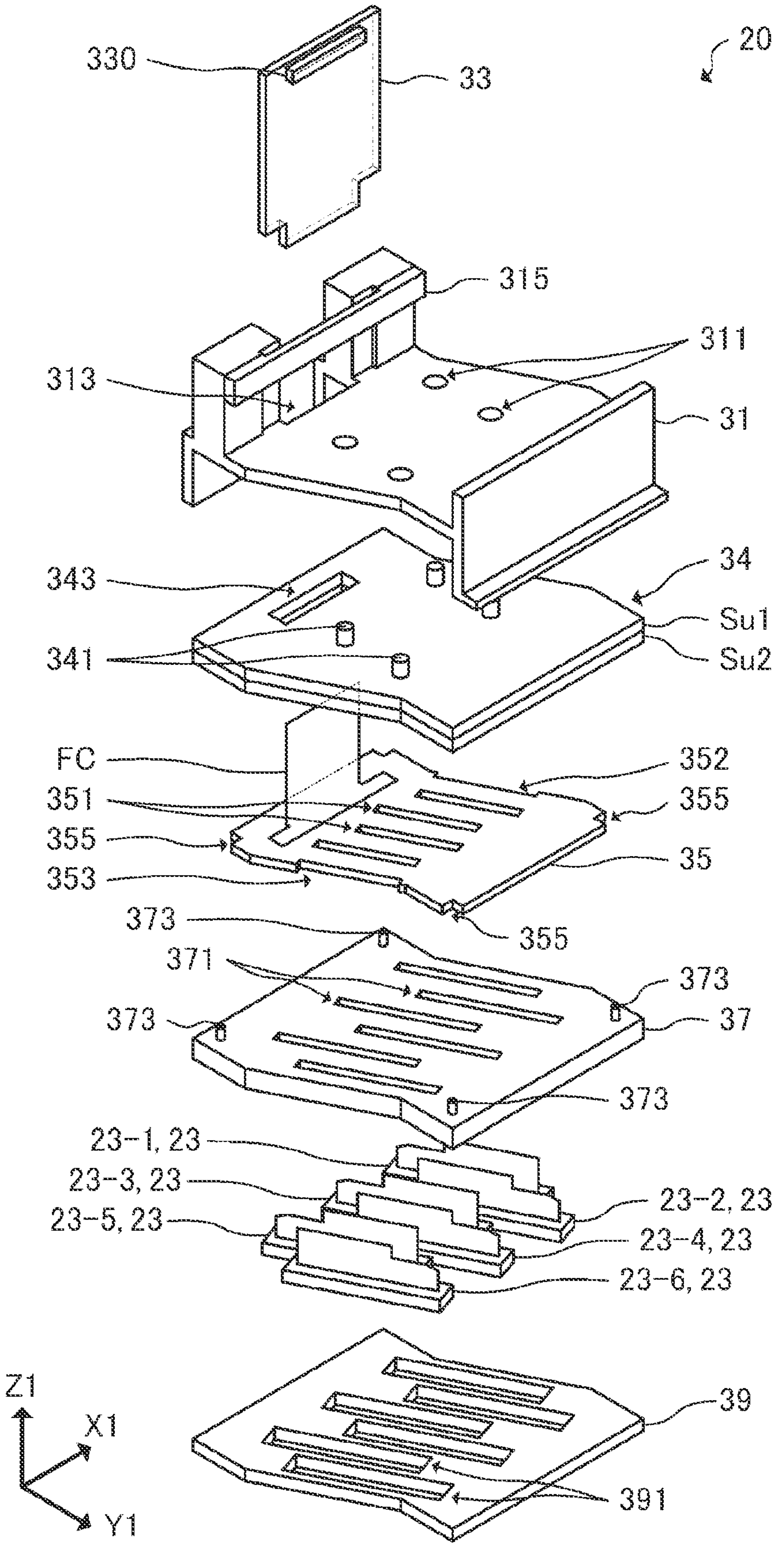
FIG. 8 is a diagram illustrating a structure of a liquid discharge module.
Figure 9:
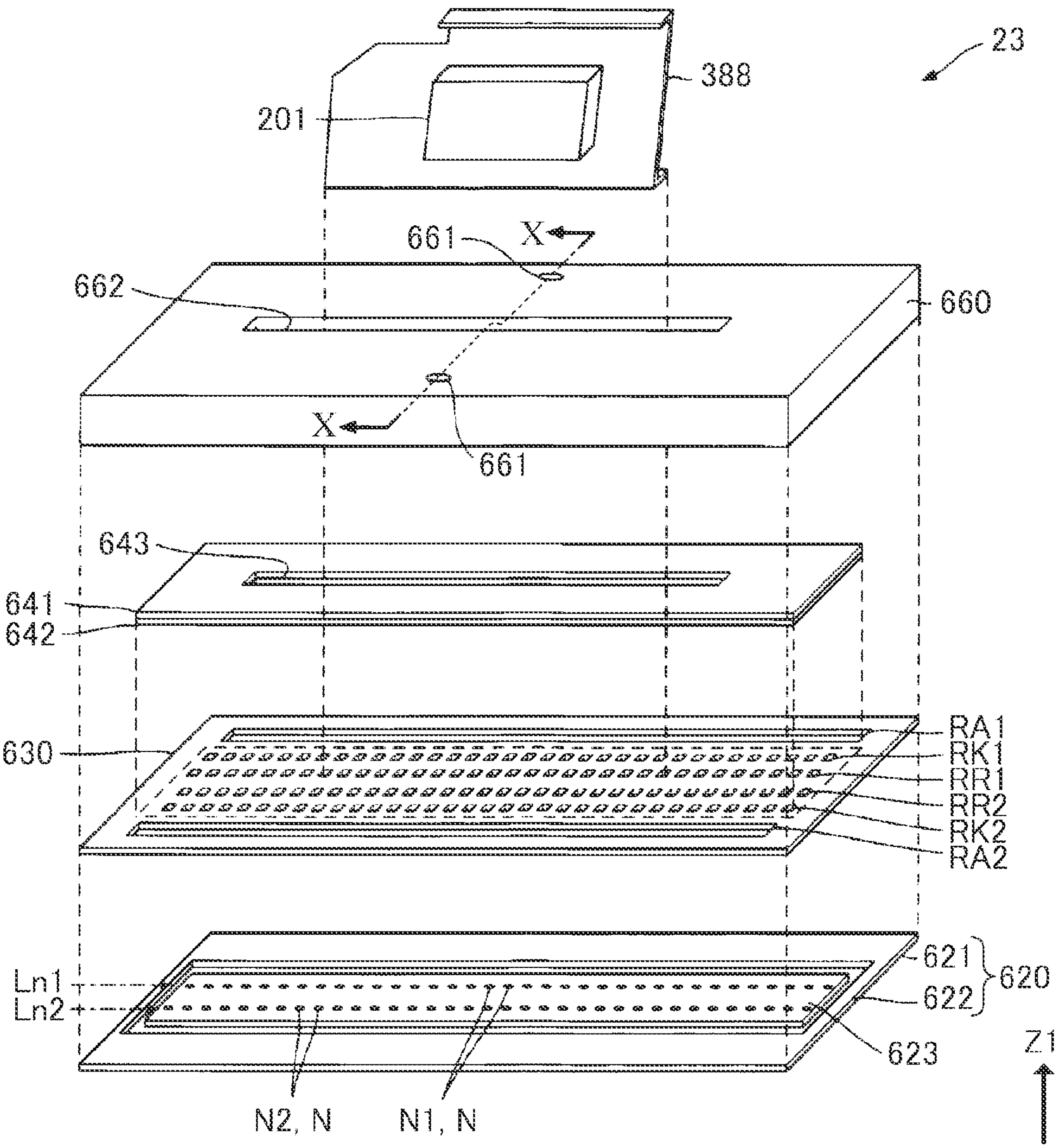
FIG. 9 is a diagram illustrating an example of a structure of a discharge module.
Figure 10:
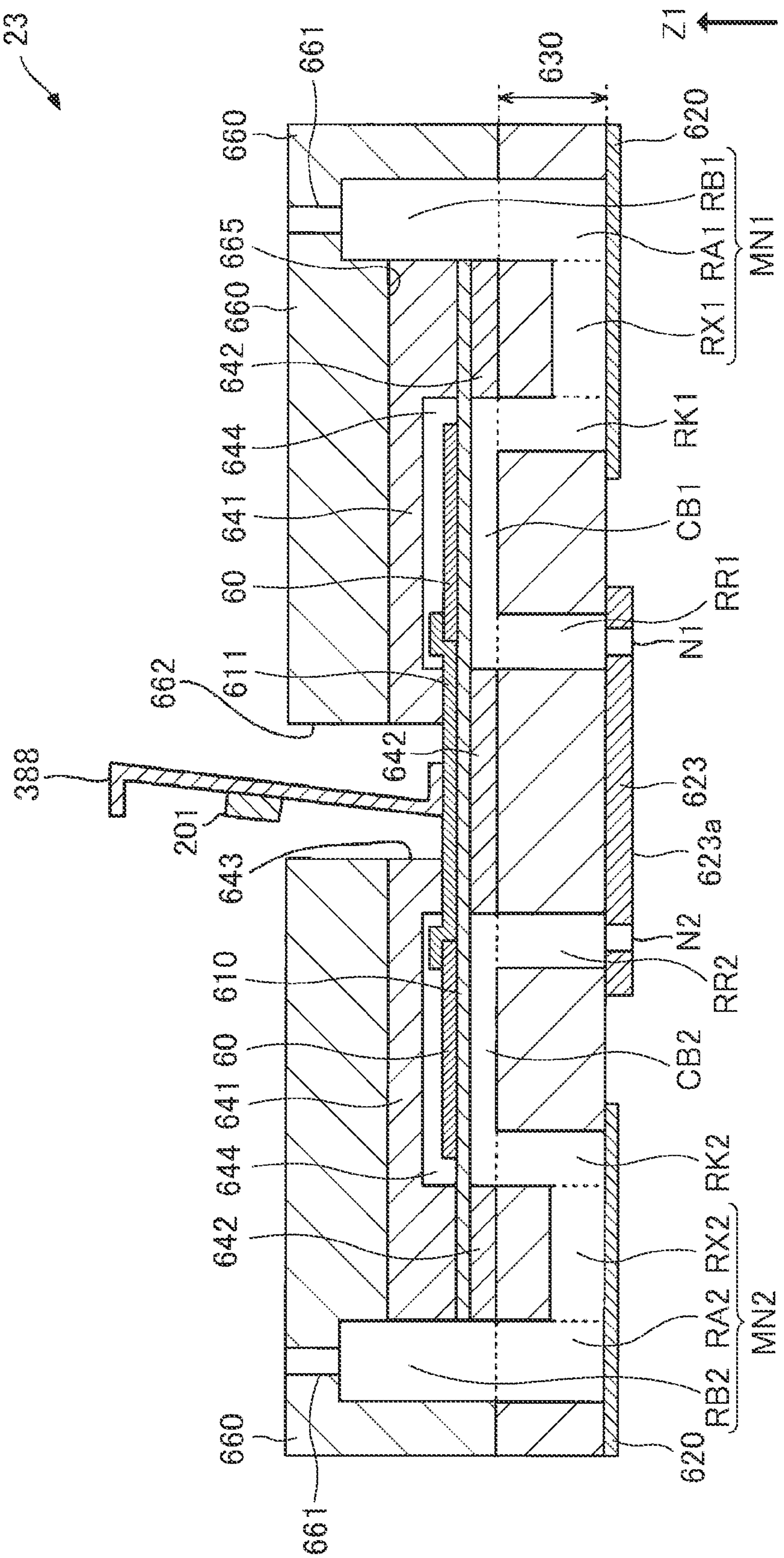
FIG. 10 is a cross-sectional view of the discharge module when the discharge module is cut along the line X-X illustrated in FIG. 9.

Next, a structure of the liquid discharge module 20 will be described with reference to FIGS. 8 to 10. FIG. 8 is a diagram illustrating the structure of the liquid discharge module 20. Here, in describing the structure of the liquid discharge module 20, FIGS. 8 to 10 illustrate arrows indicating an X1 direction, a Y1 direction, and a Z1 direction orthogonal to each other. In addition, in the description of FIGS. 8 to 10, a starting point side of the arrow indicating the X1 direction may be referred to as a −X1 side, a tip end side thereof may be referred to as a +X1 side, a starting point side of the arrow indicating the Y1 direction may be referred to as a −Y1 side, a tip end side thereof may be referred to as a +Y1 side, a starting point side of the arrow indicating the Z1 direction may be referred to as a −Z1 side, and a tip end side thereof may be referred to as a +Z1 side. In addition, in the following description, the liquid discharge module 20 included in the liquid discharge apparatus 1 according to the first embodiment will be described as having six discharge modules 23, and, when distinguishing between the six discharge modules 23, the discharge modules 23 may be referred to as discharge modules 23-1 to 23-6.

The liquid discharge module 20 includes a housing 31, an aggregate substrate 33, a flow path structure 34, a head substrate 35, a distribution flow path 37, a fixing plate 39, and discharge modules 23-1 to 23-6. In the liquid discharge module 20, the flow path structure 34, the head substrate 35, the distribution flow path 37, and the fixing plate 39 are laminated in the order of the fixing plate 39, the distribution flow path 37, the head substrate 35, and the flow path structure 34 from the −Z1 side to the +Z1 side along the Z1 direction, and the housing 31 is located around the flow path structure 34, the head substrate 35, the distribution flow path 37, and the fixing plate 39 so as to support the flow path structure 34, the head substrate 35, the distribution flow path 37, and the fixing plate 39. The aggregate substrate 33 is erected on the +Z1 side of the housing 31 in a state of being held by the housing 31, and the six discharge modules 23 are located between the distribution flow path 37 and the fixing plate 39 such that a part of the six discharge modules 23 is exposed to an outside of the liquid discharge module 20.

In describing the structure of the liquid discharge module 20, first, a structure of the discharge module 23 included in the liquid discharge module 20 will be described. FIG. 9 is a diagram illustrating an example of the structure of the discharge module 23. In addition, FIG. 10 is a diagram illustrating an example of a cross section of the discharge module 23. Here, FIG. 10 is a cross-sectional view of the discharge module 23 when the discharge module 23 is cut along the line X-X illustrated in FIG. 9, and the line X-X illustrated in FIG. 9 is an imaginary line segment that passes through an introduction path 661 of the discharge module 23 and passes through a nozzle and a nozzle N2.

As illustrated in FIGS. 9 and 10, the discharge module 23 includes a plurality of nozzles N1 arranged side by side and a plurality of nozzles N2 arranged side by side. The total number of the nozzles N1 and the nozzles N2 included in the discharge module 23 is n, which is the same as the number of the discharge sections 600 included in the discharge module 23. In the first embodiment, the number of the nozzles N1 and the number of the nozzles N2 included in the discharge module 23 will be described as being the same. That is, the discharge module 23 will be described as having n/2 nozzles N1 and n/2 nozzles N2. Here, when it is not necessary to distinguish between the nozzle N1 and the nozzle N2 in the following description, the nozzles may be simply referred to as a nozzle N.

The discharge module 23 includes a wiring member 388, a case 660, a protective substrate 641, a flow path formation substrate 642, a communication plate 630, a compliance substrate 620, and a nozzle plate 623.

On the flow path formation substrate 642, pressure chambers CB1, which are partitioned by a plurality of partition walls by anisotropic etching from one surface side, are arranged side by side corresponding to the nozzle N1, and pressure chambers CB2, which are partitioned by a plurality of partition walls by anisotropic etching from one surface side, are arranged side by side corresponding to the nozzle N2. Here, in the following description, when it is not necessary to distinguish between the pressure chamber CB1 and the pressure chamber CB2, the pressure chambers CB1 and CB2 may be simply referred to as a pressure chamber CB.

The nozzle plate 623 is located on the −Z1 side of the flow path formation substrate 642. The nozzle plate 623 is provided with a nozzle row Ln1 formed by n/2 nozzles N1 and a nozzle row Ln2 formed by n/2 nozzles N2. Here, in the following description, a surface on the −Z1 side of the nozzle plate 623 to which the nozzle N is open may be referred to as a liquid ejection surface 623*a*.

The communication plate 630 is located on the −Z1 side of the flow path formation substrate 642 and on the +Z1 side of the nozzle plate 623. The communication plate 630 is provided with a nozzle communication path RR1 through which the pressure chamber CB1 communicates with the nozzle N1, and a nozzle communication path RR2 through which the pressure chamber CB2 communicates with the nozzle N2. In addition, in the communication plate 630, a pressure chamber communication path RK1 through which an end portion of the pressure chamber CB1 communicates with a manifold MN1, and a pressure chamber communication path RK2 through which an end portion of the pressure chamber CB2 communicates with a manifold MN2 are independently provided corresponding to the pressure chambers CB1 and CB2, respectively.

The manifold MN1 includes a supply communication path RA1 and a coupling communication path RX1. The supply communication path RA1 is provided so as to penetrate the communication plate 630 along the Z1 direction, and the coupling communication path RX1 is provided halfway in the Z1 direction to be open to a side of the nozzle plate 623 of the communication plate 630 without penetrating the communication plate 630 in the Z1 direction. Similarly, the manifold MN2 includes a supply communication path RA2 and a coupling communication path RX2. The supply communication path RA2 is provided so as to penetrate the communication plate 630 along the Z1 direction, and the coupling communication path RX2 is provided halfway in the Z1 direction to be open to a side of the nozzle plate 623 of the communication plate 630 without penetrating the communication plate 630 in the Z1 direction. The coupling communication path RX1 included in the manifold MN1 communicates with the corresponding pressure chamber CB1 by the pressure chamber communication path RK1, and the coupling communication path RX2 included in the manifold MN2 communicates with the corresponding pressure chamber CB2 by the pressure chamber communication path RK2.

Here, in the following description, when it is not necessary to distinguish between the nozzle communication path RR1 and the nozzle communication path RR2, the nozzle communication paths RR1 and RR2 may be simply referred to as a nozzle communication path RR, and it is not necessary to distinguish between the manifold MN1 and the manifold MN2, the manifolds may be simply referred to as a manifold MN. When it is not necessary to distinguish between the supply communication path RA1 and the supply communication path RA2, the supply communication paths RA1 and RA2 may be simply referred to as a supply communication path RA, and when it is not necessary to distinguish between the coupling communication path RX1 and the coupling communication path RX2, the coupling communication paths RX1 and RX2 may be simply referred to as a coupling communication path RX.

A diaphragm 610 is located on a surface on the +Z1 side of the flow path formation substrate 642. In addition, two rows of the piezoelectric elements 60 are formed corresponding to the nozzles N1 and N2 on a surface on the +Z1 side of the diaphragm 610. One electrode of the piezoelectric element 60 and a piezoelectric layer are formed for each pressure chamber CB, and the other electrode of the piezoelectric element 60 is configured as a common electrode for the pressure chamber CB. The drive signal VOUT is supplied from the drive signal selection circuit 200 to one electrode of the piezoelectric element 60, and the reference voltage signal VBS is supplied to the common electrode which is the other electrode of the piezoelectric element 60.

The protective substrate 641 is bonded to the surface on the +Z1 side of the flow path formation substrate 642. The protective substrate 641 forms a protective space 644 for protecting the piezoelectric element 60. In addition, the protective substrate 641 is provided with a through-hole 643 penetrating the protective substrate 641 along the Z1 direction. An end portion of a lead electrode 611 drawn out from the electrode of the piezoelectric element 60 is extended so as to be exposed inside the through-hole 643. The wiring member 388 is electrically coupled to the end portion of the lead electrode 611 exposed inside the through-hole 643.

In addition, a case 660 that defines a part of the manifold MN communicating with a plurality of the pressure chambers CB is fixed to the protective substrate 641 and the communication plate 630. The case 660 is bonded to the protective substrate 641 and also bonded to the communication plate 630. Specifically, the case 660 includes, on a surface on the −Z1 side, a recessed portion 665 in which the flow path formation substrate 642 and the protective substrate 641 are accommodated. The recessed portion 665 has an opening area wider than a surface on which the protective substrate 641 is bonded to the flow path formation substrate 642. An opening surface of the recessed portion 665 on the −Z1 side is sealed by the communication plate 630 in a state where the flow path formation substrate 642 and the like are accommodated in the recessed portion 665. As a result, a supply communication path RB1 and a supply communication path RB2 are defined by the case 660, the flow path formation substrate 642, and the protective substrate 641 on an outer peripheral portion of the flow path formation substrate 642. Here, when it is not necessary to distinguish between the supply communication path RB1 and the supply communication path RB2, the supply communication paths RB1 and RB2 may be simply referred to as a supply communication path RB.

In addition, the compliance substrate 620 is provided on the surface of the communication plate 630 to which the supply communication path RA and the coupling communication path RX are open. The compliance substrate 620 seals openings of the supply communication path RA and the coupling communication path RX. Such a compliance substrate 620 includes a sealing film 621 and a fixed substrate 622. The sealing film 621 is formed of a flexible thin film or the like, and the fixed substrate 622 is formed of a hard material such as a metal, such as stainless steel.

The case 660 is provided with the introduction path 661 for supplying an ink to the manifold MN. In addition, the case 660 is provided with a coupling port 662 which is an opening communicating with the through-hole 643 of the protective substrate 641 and penetrating the case 660 along the Z1 direction, and into which the wiring member 388 is inserted.

The wiring member 388 is a flexible member for electrically coupling the discharge module 23 and the head substrate 35, and for example, an FPC can be used. In addition, an integrated circuit 201 is mounted on the wiring member 388 by chip on film (COF). At least a part of the drive signal selection circuit 200 described above is mounted on the integrated circuit 201.

In the discharge module 23 configured as described above, the drive signal VOUT output by the drive signal selection circuit 200 and the reference voltage signal VBS are supplied to the piezoelectric element 60 via the wiring member 388. The piezoelectric element 60 is driven by a change in the potential difference between the drive signal VOUT and the reference voltage signal VBS. As the piezoelectric element 60 is driven, the diaphragm 610 is displaced in a vertical direction, and an internal pressure of the pressure chamber CB changes. Because of the change in the internal pressure of the pressure chamber CB, the ink stored inside the pressure chamber CB is discharged from the corresponding nozzle N. Here, in the discharge module 23, the configuration including the nozzle N, the nozzle communication path RR, the pressure chamber CB, the piezoelectric element 60, and the diaphragm 610 corresponds to the discharge section 600 described above.

Returning to FIG. 8, the fixing plate 39 is located on the −Z1 side of the discharge module 23. The fixing plate 39 fixes the six discharge modules 23. Specifically, the fixing plate 39 includes six opening portions 391 penetrating the fixing plate 39 along the Z2 direction. The liquid ejection surface 623*a* of the discharge module 23 is exposed from each of the six opening portions 391. That is, the six discharge modules 23 are fixed to the fixing plate 39 such that the liquid ejection surface 623*a* is exposed from each of the corresponding opening portions 391.

The distribution flow path 37 is located on the +Z1 side of the discharge module 23. Four introduction portions 373 are provided on a surface on the +Z1 side of the distribution flow path 37. The four introduction portions 373 are flow path tubes that protrude from the surface on the +Z1 side of the distribution flow path 37 toward the +Z1 side along the Z1 direction, and communicate with a flow path hole (not illustrated) formed on a surface on the −Z1 side of the flow path structure 34. In addition, a flow path tube (not illustrated) that communicates with the four introduction portions 373 is located on a surface on the −Z1 side of the distribution flow path 37. The flow path tube (not illustrated) located on the surface on the −Z1 side of the distribution flow path 37 communicates with the introduction path 661 included in each of the six discharge modules 23. In addition, the distribution flow path 37 includes six opening portions 371 penetrating the distribution flow path 37 along the Z1 direction. The wiring member 388 included in each of the six discharge modules 23 is inserted into the six opening portions 371.

The head substrate 35 is located on the +Z1 side of the distribution flow path 37. A wiring member FC electrically coupled to the aggregate substrate 33 described below is attached to the head substrate 35. In addition, the head substrate 35 is formed with four opening portions 351 and notches 352 and 353. The wiring members 388 included in the discharge modules 23-2 to 23-5 are inserted into the four opening portions 351. The wiring member 388 of each of the discharge modules 23-2 to 23-5 inserted into the four opening portions 351 is electrically coupled to the head substrate 35 by solder or the like. In addition, the wiring member 388 included in the discharge module 23-1 passes through the notch 352, and the wiring member 388 included in the discharge module 23-6 passes through the notch 353. The wiring member 388 included in each of the discharge modules 23-1 and 23-6 that have passed through the notches 352 and 353 is electrically coupled to the head substrate 35 by solder or the like.

In addition, four notches 355 are formed at four corners of the head substrate 35. The introduction portions 373 pass through the four notches 355. The four introduction portions 373 that have passed through the notches 355 are coupled to the flow path structure 34 located on the +Z1 side of the head substrate 35.

The flow path structure 34 includes a flow path plate Su1 and a flow path plate Su2. The flow path plate Su1 and the flow path plate Su2 are laminated along the Z1 direction in a state where the flow path plate Su1 is located on the +Z1 side and the flow path plate Su2 is located on the −Z1 side, and are bonded to each other by an adhesive or the like.

The flow path structure 34 includes four introduction portions 341 protruding toward the +Z1 side along the Z1 direction on a surface on the +Z1 side. The four introduction portions 341 communicate with the flow path hole (not illustrated) formed on the surface on the −Z1 side of the flow path structure 34 via an ink flow path formed inside the flow path structure 34. The flow path hole (not illustrated) formed on the surface on the −Z1 side of the flow path structure 34 and the four introduction portions 373 communicate with each other. In addition, the flow path structure 34 is formed with a through-hole 343 penetrating the flow path structure 34 along the Z1 direction. The wiring member FC that is electrically coupled to the head substrate 35 is inserted into the through-hole 343. In addition, inside the flow path structure 34, in addition to the ink flow path through which the introduction portion 341 communicates with the flow path hole (not illustrated) formed on the surface on the −Z1 side, a filter or the like for capturing foreign matter contained in the ink flowing through the ink flow path may be provided.

The housing 31 is located so as to cover the periphery of the flow path structure 34, the head substrate 35, the distribution flow path 37, and the fixing plate 39, and supports the flow path structure 34, the head substrate 35, the distribution flow path 37, and the fixing plate 39.

The housing 31 includes four opening portions 311, an aggregate substrate insertion portion 313, and a holding member 315.

The four introduction portions 341 included in the flow path structure 34 are inserted into the four opening portions 311. An ink is supplied from the liquid container 3 to the four introduction portions 341 inserted into the four opening portions 311 via a tube (not illustrated) or the like.

The holding member 315 holds the aggregate substrate 33 in a state where a part of the aggregate substrate 33 is inserted into the aggregate substrate insertion portion 313. The aggregate substrate 33 is provided with a coupling portion 330. Various signals such as the data signal DATA, the drive signals COMA, COMB, and COMC, the reference voltage signal VBS, and other power supply voltages output by the head drive module 10 are input to the coupling portion 330 via the wiring member 30. In addition, the wiring member FC included in the head substrate 35 is electrically coupled to the aggregate substrate 33. As a result, the aggregate substrate 33 and the head substrate 35 are electrically coupled to each other. The aggregate substrate 33 may be provided with a semiconductor device including the above-described restoration circuit 220. Although FIG. 8 illustrates a case where the aggregate substrate 33 includes one coupling portion 330, when the liquid discharge apparatus 1 includes a plurality of the wiring members 30, and various signals such as the data signal DATA, the drive signals COMA, COMB, and COMC, the reference voltage signal VBS, and other power supply voltages output by the head drive module 10 are input to the aggregate substrate 33 via the plurality of wiring members 30, the aggregate substrate 33 may include a plurality of the coupling portions 330 corresponding to the plurality of wiring members 30.

In the liquid discharge module 20 configured as described above, the ink stored in the liquid container 3 is supplied by the communication between the liquid container 3 and the introduction portion 341 via a tube or the like (not illustrated). The ink supplied to the liquid discharge module 20 is guided to a flow path hole (not illustrated) formed on the surface on the −Z1 side of the flow path structure 34 via the ink flow path formed inside the flow path structure 34, and then is supplied to the four introduction portions 373 included in the distribution flow path 37. The ink supplied to the distribution flow path 37 via the four introduction portions 373 is distributed correspondingly to each of the six discharge modules 23 in an ink flow path (not illustrated) formed inside the distribution flow path 37, and then supplied to the introduction path 661 included in the corresponding discharge module 23. The ink supplied to the discharge module 23 via the introduction path 661 is stored in the pressure chamber CB included in the discharge section 600.

In addition, the head drive module 10 and the liquid discharge module 20 are electrically coupled to each other by one or a plurality of wiring members 30. As a result, various signals including the drive signals COMA, COMB, and COMC, the reference voltage signal VBS, and the data signal DATA output by the head drive module 10 are supplied to the liquid discharge module 20. Various signals including the drive signals COMA, COMB, and COMC, the reference voltage signal VBS, and the data signal DATA input to the liquid discharge module 20 are propagated through the aggregate substrate 33 and the head substrate 35. At this time, the restoration circuit 220 generates the clock signals SCK1 to SCK6, the print data signals SI1 to SI6, and the latch signals LAT1 to LAT6 corresponding to the discharge modules 23-1 to 23-6, from the data signal DATA. The integrated circuit 201 including the drive signal selection circuit 200 provided in the wiring member 388 generates the drive signal VOUT corresponding to each of the n discharge sections 600, and supplies the drive signal VOUT to the piezoelectric element 60 included in the corresponding discharge section 600. As a result, the piezoelectric element 60 is driven, and the ink stored in the pressure chamber CB is discharged.

1.4 Structure of Head Drive Module

Next, a structure of the head drive module 10 will be described with reference to FIGS. 11 to 17. Here, FIGS. 11 to 17 illustrate arrows indicating an X2 direction, a Y2 direction, and a Z2 direction which are independent of the above-described X1 direction, Y1 direction, and Z1 direction and are orthogonal to each other. In addition, in the description of FIGS. 11 to 17, a starting point side of the arrow indicating the X2 direction may be referred to as a −X2 side, a tip end side thereof may be referred to as a +X2 side, a starting point side of the arrow indicating the Y2 direction may be referred to as a −Y2 side, a tip end side thereof may be referred to as a +Y2 side, a starting point side of the arrow indicating the Z2 direction may be referred to as a −Z2 side, and a tip end side thereof may be referred to as a +Z2 side. In addition, in FIGS. 11 to 17, as an example, a case where the Z2 direction is a direction opposite to a gravity direction, that is, an upward direction will be described. In addition, in FIGS. 11 to 17, as an example, a case where the direction opposite to the Z2 direction is the gravity direction, that is, a downward direction will be described. In addition, in FIGS. 11 to 17, as an example, a case where a direction opposite to the X2 direction is the transport direction will be described. In addition, in FIGS. 11 to 17, as an example, a case where a direction parallel to the Y2 direction is the main scanning direction will be described. In addition, as an example, a case where m=6 will be described below. In the present embodiment, the head drive module 10 is an example of a drive circuit unit. In addition, in the present embodiment, the liquid discharge module 20 is an example of a head. In addition, in the present embodiment, the combination of the head drive module 10 and the liquid discharge module 20 is an example of a head unit. That is, in the present embodiment, the head drive module 10 and the liquid discharge module 20 constitute a head unit. In addition, for convenience of description, a direction in which a liquid is discharged from the liquid discharge module 20 is referred to as a first direction, and a direction opposite to the first direction is referred to as a second direction. In addition, in the present embodiment, as an example, a case where the first direction coincides with the downward direction will be described. In addition, in the present embodiment, as an example, a case where the control circuit 100 and the conversion circuit 120 are included in the common FPGA will be described. The conversion circuit 120 may have a configuration that does not include the FPGA.

Figure 11:
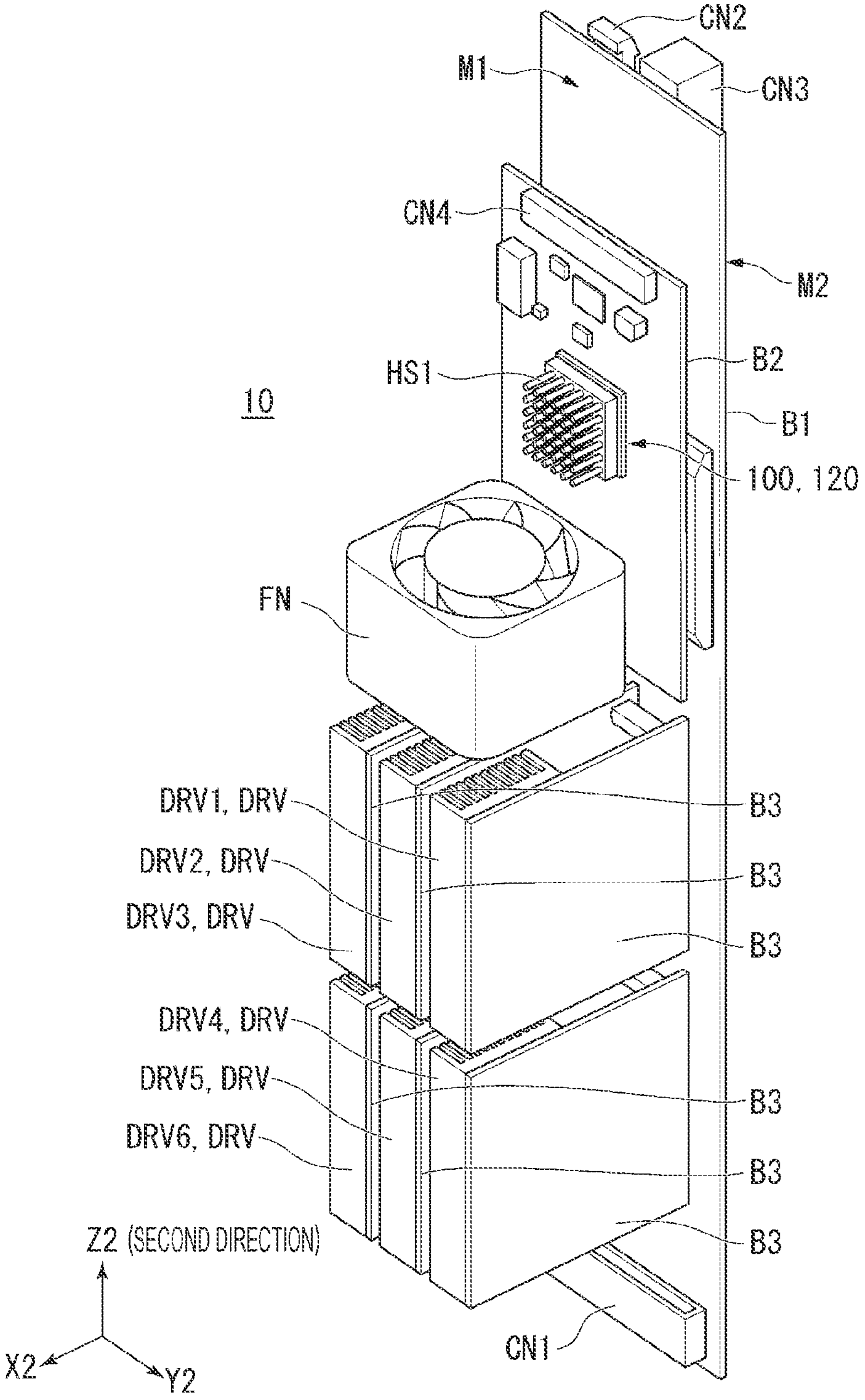
FIG. 11 is a perspective view illustrating an example of a structure of a head drive module.
Figure 12:
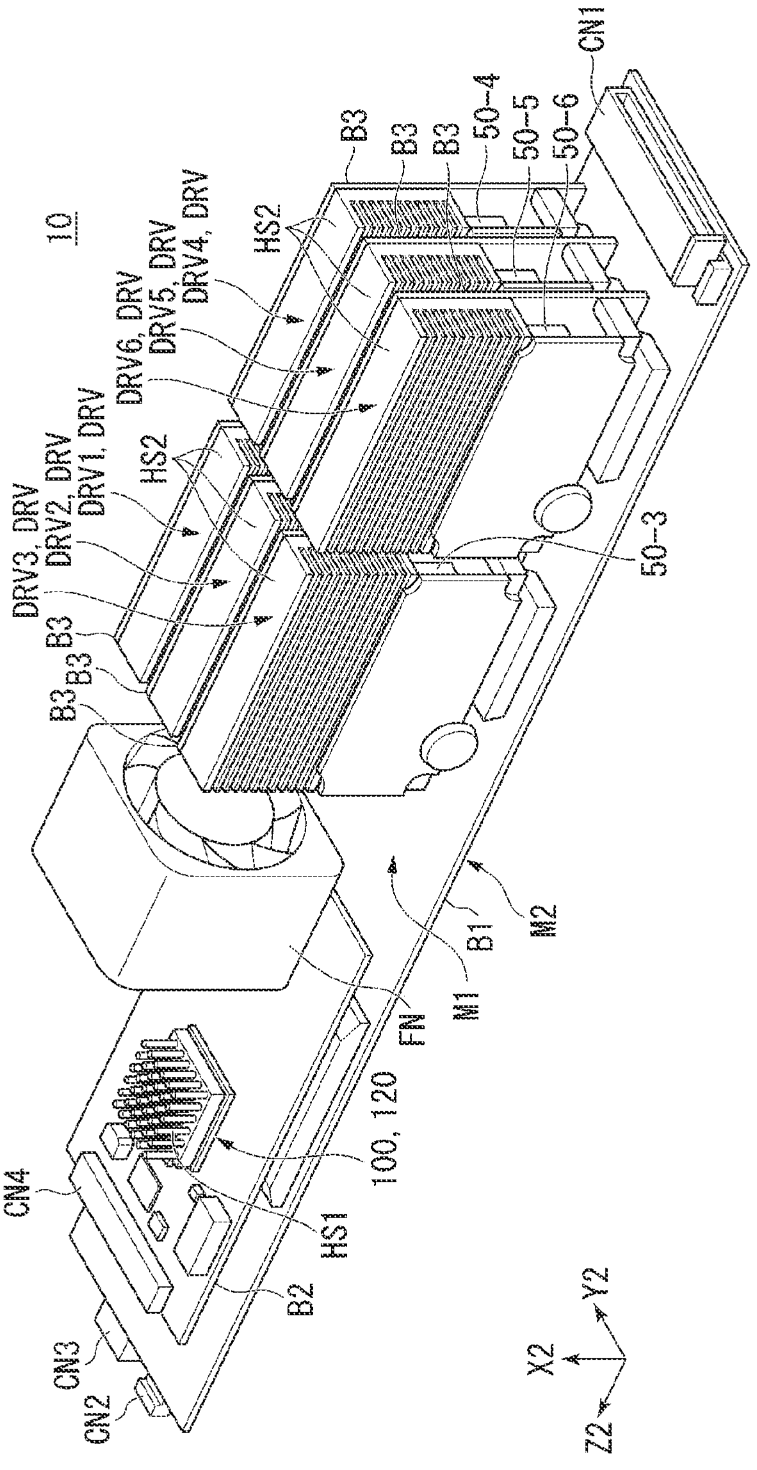
FIG. 12 is a perspective view of the head drive module illustrated in FIG. 11 when viewed from another direction.
Figure 13:
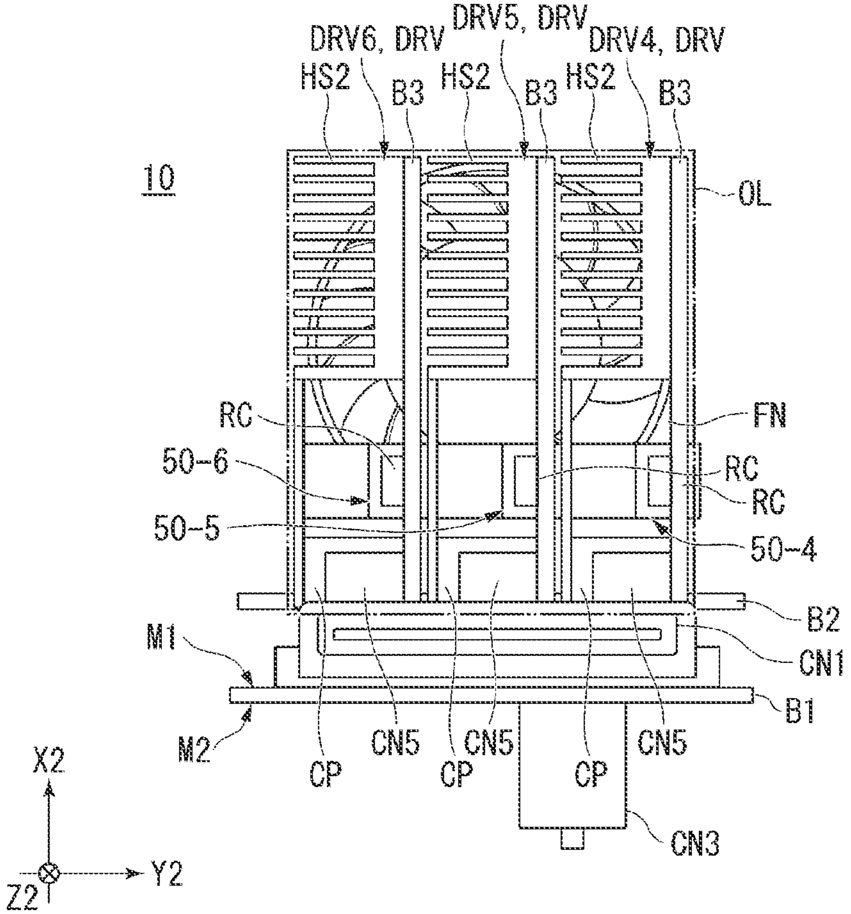
FIG. 13 is a bottom view of the head drive module illustrated in FIG. 11 when viewed from bottom to top.

FIG. 11 is a perspective view illustrating an example of the structure of the head drive module 10. In addition, FIG. 12 is a perspective view of the head drive module 10 illustrated in FIG. 11 when viewed from another direction. In addition, FIG. 13 is a bottom view of the head drive module 10 illustrated in FIG. 11 when viewed from bottom to top. As illustrated in FIGS. 11 to 13, the head drive module 10 includes a first substrate B1, a second substrate B2, a fan FN, a control circuit 100, a conversion circuit 120, a heat sink HS1, six drive circuit sections DRV, and a first connector CN1 to a fourth connector CN4. The head drive module 10 may be configured not to have the fan FN. In this case, the liquid discharge apparatus 1 includes one or more fans to cool each of, for example, the control circuit 100, the conversion circuit 120, the heat sink HS1, and the six drive circuit sections DRV as separate fans from the head drive module 10.

The first substrate B1 is a power supply board that supplies power to each member included in the head drive module 10. In addition, the first substrate B1 is a substrate disposed on the second direction side with respect to the liquid discharge module 20 (not illustrated in FIG. 11) when the head drive module 10 is coupled to the liquid discharge module 20. In addition, the first substrate B1 is a rectangular flat plate-shaped substrate in which longitudinal directions of a first surface M1 and a second surface M2, which are two surfaces of the first substrate B1, extend toward the Z2 direction, and lateral directions of the first surface M1 and the second surface M2 extend toward the Y2 direction.

Here, in the present embodiment, the fact that a longitudinal direction or a lateral direction of a certain member extends in a certain direction may mean either that the certain member extends in the certain direction or that the certain member extends in a direction oblique to the certain direction. In the following, as an example, as illustrated in FIGS. 11 to 13, a case where the first substrate B1 is a rectangular flat plate-shaped substrate in which the longitudinal directions of the first surface M1 and the second surface M2 extend in the Z2 direction, and the lateral directions of the first surface M1 and the second surface M2 extend in the Y2 direction will be described. In this case, each of the first surface M1 and the second surface M2 is a surface parallel to the first direction as illustrated in FIGS. 11 to 13. When the longitudinal directions of the first surface M1 and the second surface M2 extend in a direction oblique to the Z2 direction, each of the first surface M1 and the second surface M2 is a surface oblique to the first direction.

The first substrate B1 may be coupled to the liquid discharge module 20 via the wiring member 30, or may be B-to-B-coupled to the liquid discharge module 20 not via the wiring member 30.

The six drive circuit sections DRV, the second substrate B2, and the like are mounted on the first surface M1 of the first substrate B1. Hereinafter, for convenience of description, each of these six drive circuit sections DRV will be referred to as a drive circuit section DRV1 to a drive circuit section DRV6. In addition, the first connector CN1 is provided at an end portion on the −Z2 side among end portions of the first surface M1 of the first substrate B1. The second connector CN2 and the third connector CN3 are provided at an end portion on the +Z2 side among end portions of the second surface M2 of the first substrate B1. As described above, the first substrate B1 has the first connector CN1, the second connector CN2, and the third connector CN3.

The first connector CN1 is a connector to which a transmission cable through which the drive signal output from each of the drive circuit 52*a*, the drive circuit 52*b*, and the drive circuit 52*c* included in the drive circuit section DRV described below is transmitted is coupled. The liquid discharge module 20 or the wiring member 30 coupled to the liquid discharge module 20 is coupled to the first connector CN1. Therefore, the drive signal output from the drive circuit section DRV is output to the liquid discharge module 20 via the first connector CN1. In the examples illustrated in FIGS. 11 to 13, the first connector CN1 is provided on the first surface M1 among the two surfaces of the first substrate B1. The first connector CN1 may be provided on the second surface M2 of the first substrate B1.

The second connector CN2 is a connector to which a power supply cable that supplies power to the fan FN is coupled. The second connector CN2 is provided on the second surface M2 of the first substrate B1. The second connector CN2 may be provided on the first surface M1 of the first substrate B1.

The third connector CN3 is a connector to which a power supply cable for supplying power to the first substrate B1, which is a power supply board, is coupled. The third connector CN3 is provided on the second surface M2 of the first substrate B1. The third connector CN3 may be provided on the first surface M1 of the first substrate B1.

An i-th drive circuit section DRVi among the six drive circuit sections DRV is provided on the first surface M1 of the first substrate B1. In other words, the drive circuit section DRVi is coupled onto the first surface M1 of the first substrate B1. The drive circuit section DRVi includes a drive signal output circuit 50-*i*. That is, the drive circuit section DRVi includes three drive circuits of the drive circuit 52*a*, the drive circuit 52*b*, and the drive circuit 52*c* (not illustrated in FIG. 11), and the reference voltage output circuit 53. Here, i is an integer from 1 to 6.

In addition, the drive circuit section DRVi includes a third substrate B3 on which the drive signal output circuit 50-*i* is mounted, and a heat sink HS2.

Figure 14:
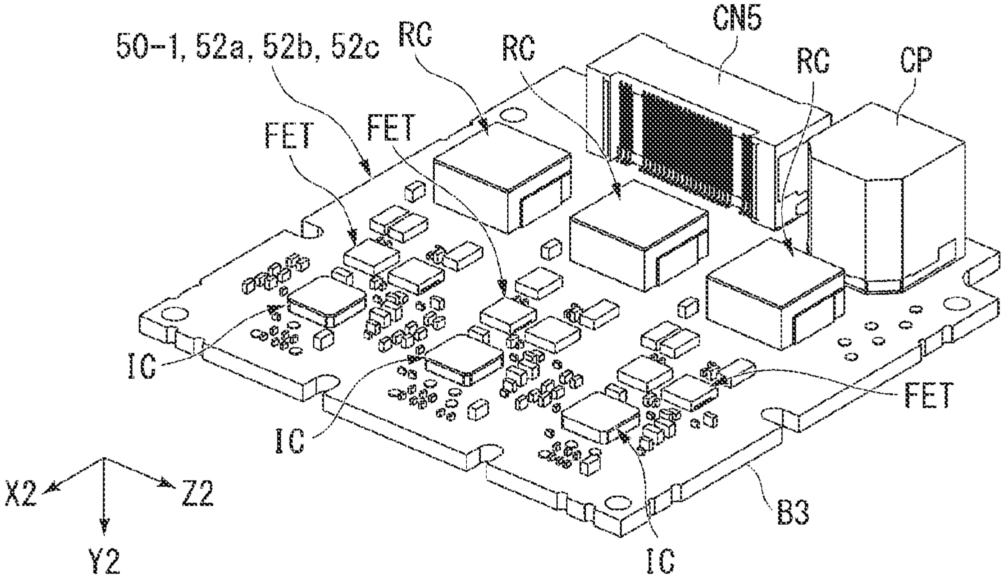
FIG. 14 is a diagram illustrating a mounting example of a drive signal output circuit on a third substrate included in a drive circuit section.

Here, as illustrated in FIGS. 11 to 13, the third substrate B3 is B-to-B-coupled to the first substrate B1 and stands upright with respect to the first substrate B1. Therefore, all couplings between the third substrate B3 and other substrates are via B-to-B coupling to the first substrate B1. In addition, as illustrated in FIG. 14, the third substrate B3 is a rectangular flat plate-shaped substrate, and the drive signal output circuit 50-*i* is mounted on the third substrate B3. FIG. 14 is a diagram illustrating a mounting example of the drive signal output circuit 50-1 on the third substrate B3 included in the drive circuit section DRV1. Since each of a mounting example of the drive signal output circuit 50-2 on the third substrate B3 to a mounting example of the drive signal output circuit 50-6 on the third substrate B3 is the same as the mounting example of the drive signal output circuit 50-1 on the third substrate B3, description thereof will be omitted. In the example shown in FIG. 14, on the third substrate B3 of the drive circuit section DRV1, three integrated circuits IC, three electric field effect transistors FET, three coils RC, one electrolytic capacitor CP constituting the drive circuit 52*a*, the drive circuit 52*b*, and the drive circuit 52*c* as class D amplifier circuits are mounted. In this example, on the third substrate B3, the three integrated circuits IC, the three electric field effect transistors FET, and the three coils RC are arranged in the X2 direction in the order of the three coils RC, the three electric field effect transistors FET, and the three integrated circuits IC. In addition, in this example, the three integrated circuits IC are arranged in the Z2 direction. In addition, in this example, the three electric field effect transistors FET are arranged in the Z2 direction. In addition, in this example, the three coils RC are arranged in the Z2 direction. In addition, in this example, the one electrolytic capacitor CP is located on the −X2 side with respect to the three coils RC. That is, in this example, the third substrate B3 is mounted with the electrolytic capacitor CP on the first substrate B1 side with respect to the drive circuit 52*a*, the drive circuit 52*b*, and the drive circuit 52*c* of the drive signal output circuit 50-1. As described above, in this example, the third substrate B3 is mounted with all electronic components taller than the drive circuit 52*a*, the drive circuit 52*b*, and the drive circuit 52*c* on the first substrate B1 side with respect to the drive circuit 52*a*, the drive circuit 52*b*, and the drive circuit 52*c*. The third substrate B3 may be mounted with another type of capacitor instead of the electrolytic capacitor CP.

In addition, a fifth connector CN5 is provided at an end portion on the −X2 side among end portions of the third substrate B3 of the drive circuit section DRV1. The fifth connector CN5 is located on the +Y2 side with respect to the one electrolytic capacitor CP. In addition, the fifth connector CN5 is coupled to a connector (not illustrated) provided on the first substrate B1. As a result, the drive circuit section DRV1 is B-to-B-coupled to the first substrate B1. As a result, the drive circuit section DRV1 is coupled onto the first substrate B1 so as to extend in a direction intersecting the first substrate B1. In the examples illustrated in FIGS. 11 to 13, the drive circuit section DRV1 is B-to-B-coupled to the first substrate B1 so as to extend in the X2 direction which is a direction orthogonal to the first substrate B1. In addition, the fifth connector CN5 is a connector for outputting, to the liquid discharge module 20, the drive signal output from each of the drive circuit 52*a*, the drive circuit 52*b*, and the drive circuit 52*c* included in the drive circuit section DRV1 via the first substrate B1. In addition, the fifth connector CN5 is a floating connector.

As a result, the head drive module 10 can suppress transmission of vibration generated by rotation of the fan FN, which will be described below, to the first substrate B1, and as a result, transmission of the vibration to each of the drive circuit 52*a*, the drive circuit 52*b*, and the drive circuit 52*c* can be suppressed. In the head drive module 10, instead of the fifth connector CN5 provided on the third substrate B3, or in addition to the fifth connector CN5 provided on the third substrate B3, the connector to which the fifth connector CN5 is coupled on the first substrate B1 may be a floating connector.

Here, as described above, in the example illustrated in FIG. 14, on the first substrate B1, the three integrated circuits IC, the three electric field effect transistors FET, and the three coils RC are arranged in the X2 direction in the order of the three coils RC, the three electric field effect transistors FET, and the three integrated circuits IC. Therefore, a distance between the three coils RC mounted on the third substrate B3 of the drive circuit section DRV1 and the fifth connector CN5 may be shorter than a distance between the three integrated circuits IC mounted on the third substrate B3 of the drive circuit section DRV1 and the fifth connector CN5. As a result, the head drive module 10 can shorten the wiring through which the drive signal output to the liquid discharge module 20 flows, and as a result, the discharge stability of the liquid can be improved.

Figure 15:
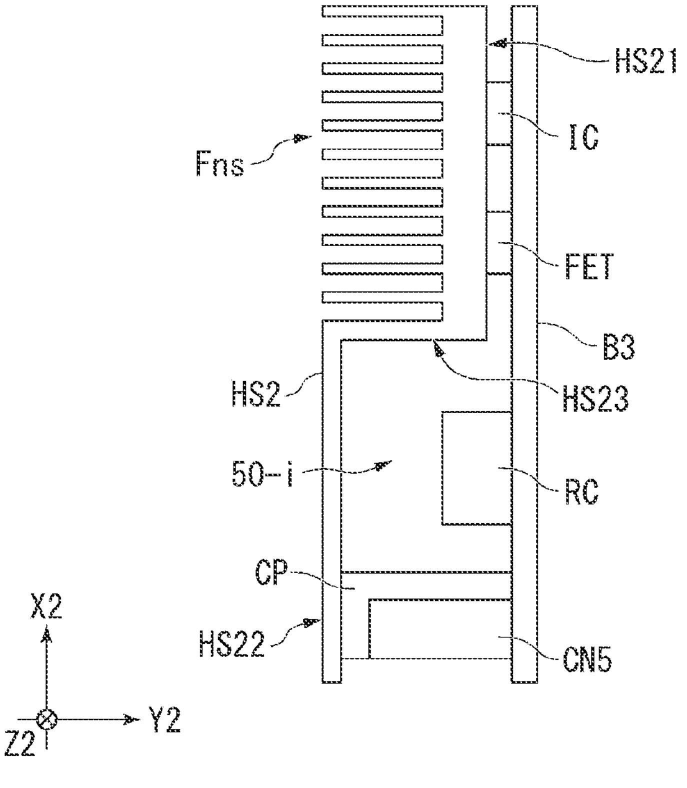
FIG. 15 is a diagram illustrating an example of a more detailed positional relationship between a heat sink, a drive signal output circuit, and the third substrate.

The heat sink HS2 is a heat sink for cooling the drive signal output circuit 50-*i*. The heat sink HS2 is provided on the third substrate B3 so as to interpose the drive signal output circuit 50-*i* mounted on the third substrate B3 together with the third substrate B3. FIG. 15 is a diagram illustrating an example of a more detailed positional relationship between the heat sink HS2, the drive signal output circuit 50-*i*, and the third substrate B3. Here, in the examples illustrated in FIGS. 11 to 13 and 15, an outer shape of the drive circuit section DRVi is a substantially rectangular shape. Such an outer shape of the drive circuit section DRVi is configured by the third substrate B3 and the heat sink HS2 included in the drive circuit section DRVi. The heat sink HS2 provided in the drive signal output circuit 50-*i* includes a first flat plate member HS21, a second flat plate member HS22, a first coupling member HS23 that couples the first flat plate member HS21 and the second flat plate member HS22, and a plurality of fins Fns provided on the first flat plate member HS21. The first flat plate member HS21 is a substantially rectangular flat plate-shaped member in contact with each of the three integrated circuits IC on the third substrate B3 and the three electric field effect transistors FET on the third substrate B3. In FIG. 15, for simplification of the drawing, the three integrated circuits IC on the third substrate B3 are illustrated as one rectangular-shaped object. In addition, in FIG. 15, for simplification of the drawing, the three electric field effect transistors FET on the third substrate B3 are illustrated as one rectangular-shaped object. The second flat plate member HS22 is a substantially rectangular flat plate-shaped member parallel to the first flat plate member HS21, and is a member separated from the third substrate B3 at a greater distance than the first flat plate member HS21. When the heat sink HS2 is viewed in the Y2 direction, an end portion on the +X2 side among end portions of the second flat plate member HS22 overlaps an end portion on the −X2 side among end portions of the first flat plate member HS21.

The first coupling member HS23 is a substantially rectangular flat plate-shaped member that couples these two end portions, and is a member that is parallel to a YZ plane stretched in the Y2 direction and in the Z2 direction. Here, in a space between the second flat plate member HS22 and the third substrate B3, the three coils RC, the electrolytic capacitor CP, and the like mounted on the third substrate B3 are located. Each of the plurality of fins Fns is a rectangular flat plate-shaped fin parallel to the YZ plane. Since the heat sink HS2 has such a configuration, the plurality of fins Fns do not substantially obstruct an airflow flowing in the first direction or in the second direction. In addition, as illustrated in FIG. 13, since the heat sink HS2 is configured without a rectangular flat plate-shaped member parallel to an XY plane stretched in the X2 direction and in the Y2 direction, the airflow flowing in the first direction or in the second direction is substantially unobstructed by the heat sink HS2. As a result, the airflow flowing in the first direction or in the second direction can efficiently dissipate heat from the drive circuit section DRVi.

As illustrated in FIGS. 11 and 12, the second substrate B2 is a rectangular flat plate-shaped substrate, and is an interface board on which the control circuit 100 and the conversion circuit 120 are mounted. More specifically, the second substrate B2 is mounted on the first surface M1 of the first substrate B1 on the +Z2 side with respect to the six drive circuit sections DRV. In addition, in the examples illustrated in FIGS. 11 and 12, the second substrate B2 is B-to-B-coupled to the first substrate B1. The second substrate B2 may be coupled to the first substrate B1 by a coupling method different from the B-to-B coupling. In addition, the fourth connector CN4 is provided at an end portion on the +Z2 side among end portions of the second substrate B2. Therefore, in this example, in the head drive module 10, the first connector CN1, the six drive circuit sections DRV, the fan FN, the conversion circuit 120, and the fourth connector CN4 are arranged in the order of the first connector CN1, the six drive circuit sections DRV, the fan FN, the conversion circuit 120, and the fourth connector CN4.

The fourth connector CN4 is a connector to which a transmission cable for transmitting a signal such as the image information signal IP input to the control circuit 100 is coupled. Therefore, the image information signal IP is input to the control circuit 100 via the fourth connector CN4. The fourth connector CN4 is also a connector that receives a control signal input to the conversion circuit 120. Therefore, a control signal is input to the conversion circuit 120 via the fourth connector CN4. Here, as described above, the second substrate B2 is B-to-B-coupled to the first substrate B1. Therefore, the conversion circuit 120 operates by the power supplied from the first substrate B1 to the second substrate B2. On the other hand, the control signal is received by the fourth connector CN4 not via the first substrate B1. That is, the conversion circuit 120 receives the control signal via the fourth connector CN4, not via the first substrate B1. The fourth connector CN4 is, for example, a right-angle connector, but may be another type of connector instead.

In addition, in the examples illustrated in FIGS. 11 and 12, the fan FN is mounted on the second substrate B2. More specifically, in this example, the fan FN is mounted on an end portion on the −Z2 side among the end portions of the second substrate B2. That is, the fan FN is mounted on the first substrate B1 via the second substrate B2. As a result, the head drive module 10 can suppress transmission of vibration generated by rotation of the fan FN to the first substrate B1 compared to a case where the fan FN is directly mounted on the first substrate B1, and as a result, transmission of the vibration to each of the drive circuit 52*a*, the drive circuit 52*b*, and the drive circuit 52*c* can be suppressed. In addition, although the fan FN is mounted on the first substrate B1 via the second substrate B2, the fan FN is supplied with power from the first substrate B1 using a cable (not illustrated). That is, the power supplied from the second connector CN2 is supplied to the fan FN via the first substrate B1 and not via the second substrate B2. That is, the fan FN operates by the power supplied from the first substrate B1. The fan FN may be directly mounted on the first substrate B1 instead of being mounted on the second substrate B2. Alternatively, the fan FN may be mounted on neither the first substrate B1 nor the second substrate B2, and may be mounted by another method such as being screwed to a frame HD. Here, in this example, the fan FN protrudes from the second substrate B2 to the six drive circuit sections DRV side. The fan FN may not protrude from the second substrate B2 to the six drive circuit sections DRV side. In addition, the fan FN may be mounted on the second substrate B2 via a floating connector. In this case, the head drive module 10 can more reliably suppress the transmission of the vibration generated by the rotation of the fan FN to the first substrate B1. In addition, in this case, the fan FN is fixed to the second substrate B2 only by the floating connector between the second substrate B2 and the fan FN, so that such vibration transmitted to the first substrate B1 can be further reduced.

The fan FN is a blower that generates wind for the drive circuit 52*a*, the drive circuit 52*b*, and the drive circuit 52*c* of each of the drive signal output circuit 50-1 to the drive signal output circuit 50-6. More specifically, the fan FN is a blower that has fins that rotate around a predetermined rotation axis and that blows air in a direction parallel to the rotation axis. In addition, the fan FN stands upright with respect to the first substrate B1 via the second substrate B2. In the examples illustrated in FIGS. 11 to 13, the predetermined rotation axis is an axis parallel to the first direction and substantially parallel to a surface of the third substrate B3. Therefore, the fan FN can create an airflow parallel to the first direction and the surface of the third substrate B3 so as to reduce a resistance to the airflow. As a result, the fan FN can more reliably dissipate heat from each of the heat sink HS2 of the drive circuit section DRV and the heat sink HS1 described below by the airflow created by the fan FN. That is, the head drive module 10 can efficiently cool at least a part of the drive circuit 52*a*, the drive circuit 52*b*, and the drive circuit 52*c* of each of the drive signal output circuit 50-1 to the drive signal output circuit 50-6. Hereinafter, as an example, a case where the fan FN blows air so as to create an airflow flowing in the second direction opposite to the first direction will be described. The fan FN may blow air so as to create an airflow flowing in the first direction. In addition, when the fan FN is directly mounted on the first substrate B1, the fan FN may stand upright with respect to the first substrate B1 not via the second substrate B2.

The heat sink HS1 is provided in an FPGA (not illustrated) including the control circuit 100 and the conversion circuit 120 on the second substrate B2. The heat sink HS1 is a heat sink for cooling the FPGA or the like. Further, in the examples illustrated in FIGS. 11 and 12, the FPGA is mounted between the heat sink HS2 and the second substrate B2 on a side adjacent to the fan FN on the +Z2 side among sides adjacent to the fan FN on the second substrate B2. As a result, the head drive module 10 can more reliably allow the airflow created to flow in the second direction by the fan FN to pass through the heat sink HS1. As a result, the head drive module 10 can improve the cooling efficiency of the FPGA. Here, the heat sink HS1 is shorter than a radius of a cylindrical region swept by the rotation of the fins rotating around the rotation axis of the fan FN. In other words, a height of the heat sink HS1 in a direction orthogonal to the second substrate B2 is lower than the radius of the cylindrical region swept by the rotation of the fins rotating around the rotation axis of the fan FN. In this example, the head drive module 10 can suppress obstruction of the airflow by the heat sink HS1 while suppressing a decrease in the cooling efficiency of the FPGA. The number of the fins of the fan FN is, for example, eight, but it is not limited to this, and may be five, twelve, or the like. A rotation speed of the fan FN is set to a speed at which resonance does not occur with peripheral components such as the second substrate B2.

Here, when the fan FN is mounted on the first substrate B1 via the second substrate B2 or not via the second substrate B2, the head drive module 10 can be reduced in size in a direction orthogonal to the first substrate B1, that is, in the transport direction, by the amount of a jig, a member, or the like for fixing the fan FN, compared to a case where the fan FN is fixed to the first substrate B1 by using a jig, a member, or the like. As a result, the liquid discharge apparatus 1 can suppress an increase in size in the transport direction. This leads to a decrease in size of the liquid discharge apparatus 1, which is useful.

Figure 16:
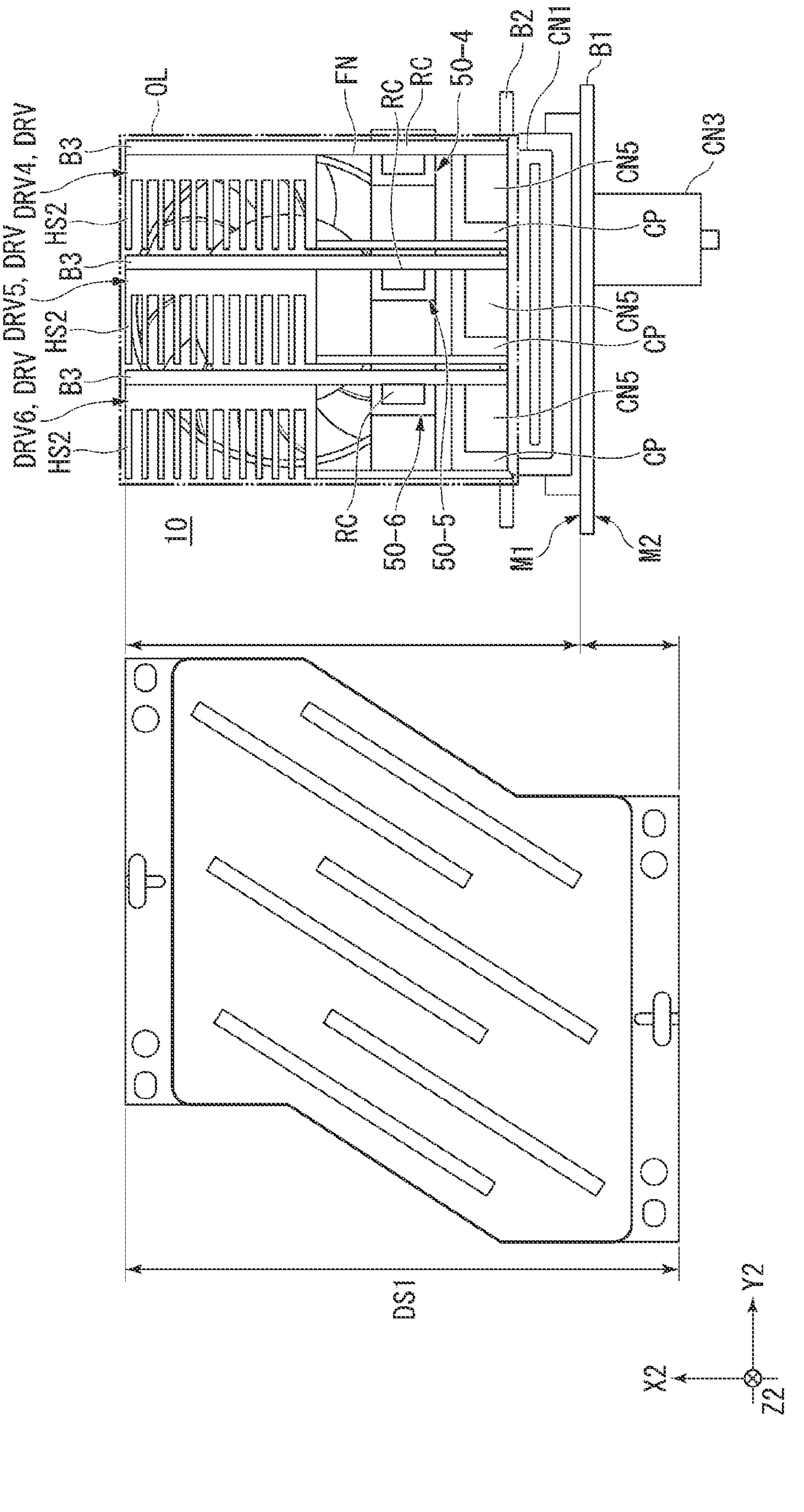
FIG. 16 is a diagram in which a length of a liquid discharge module in a transport direction is compared with a height of a highest first object in a direction orthogonal to a first surface.
Figure 17:
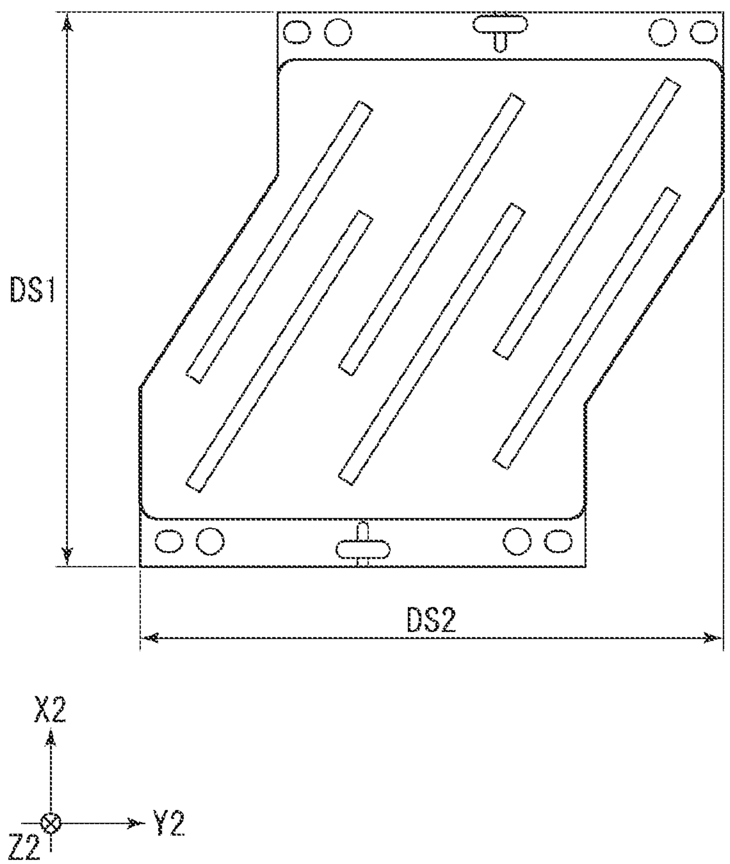
FIG. 17 is a diagram illustrating an example of a distribution flow path when viewed in a second direction.

In addition, in the examples illustrated in FIGS. 11 to 13, a height of a first object, which is the highest of objects mounted on the first surface M1 of the first substrate B1 in a direction orthogonal to the first surface M1, is equal to or less than a length of the liquid discharge module 20 in the transport direction, as illustrated in FIG. 16. FIG. 16 is a diagram in which the length of the liquid discharge module 20 in the transport direction is compared with the height of the highest first object in the direction orthogonal to the first surface M1. Here, in the examples illustrated in FIGS. 11 to 13 and FIG. 16, the first object is the drive circuit section DRV, but may be another member mounted on the first substrate B1, such as the fan FN, or may be a combination of two or more members mounted on the first substrate B1, such as both the drive circuit section DRV and the fan FN. In this case, the head drive module 10 can more reliably suppress an increase in size in the transport direction. That is, with the head drive module 10 having such a configuration, the liquid discharge apparatus 1 can more reliably suppress an increase in size in the transport direction. The length of the liquid discharge module 20 in the transport direction is represented by, for example, a length DS1 of the distribution flow path 37 in the transport direction, as illustrated in FIGS. 16 and 17. FIG. 17 is a diagram illustrating an example of the distribution flow path 37 when viewed in the second direction. As illustrated in FIG. 17, the length DS1 is a length in the transport direction of a portion with the longest length in the transport direction among portions of the distribution flow path 37.

In the head drive module 10, a sum of the height of the first object in the direction orthogonal to the first surface M1 and a height of a second object in a direction orthogonal to the second surface M2 may be equal to or less than the length of the head drive module 10 in the transport direction. Here, the second object is the highest of objects mounted on the second surface M2 opposite to the first surface M1 among the two surfaces of the first substrate B1 in the direction orthogonal to the second surface M2. The second object is, for example, the electrolytic capacitor CP, the second connector CN2, and the third connector CN3, but is not limited to these. In this case, the head drive module 10 can still more reliably suppress an increase in size in the transport direction.

That is, with the head drive module 10 having such a configuration, the liquid discharge apparatus 1 can still more reliably suppress an increase in size in the transport direction.

In addition, in the examples illustrated in FIGS. 11 to 13, as described above, the first object is the drive circuit section DRV. In this case, when the six drive circuit sections DRV are viewed in the first direction, the fan FN is included within an outline OL of an imaginary region surrounding the six drive circuit sections DRV to have a minimum area, as illustrated in FIG. 13. In other words, within a range in which the fan FN is projected in a rotation axis direction of the fan FN, the six drive circuit sections DRV, that is, the drive circuit 52*a*, the drive circuit 52*b*, and the drive circuit 52*c* of each of the drive signal output circuit 50-1 to the drive signal output circuit 50-6 are all accommodated. That is, in this example, the head drive module 10 adopts a fan FN having a size appropriate for being included within the outline OL in that case. As a result, the head drive module 10 can suppress an increase in length in the transport direction depending on the size of the fan FN. In addition, in this example, as the fan FN, a fan FN having a size appropriate for being included within the outline of the first substrate B1 when the fan FN is viewed from the direction orthogonal to the first substrate B1 is adopted. More specifically, in a direction orthogonal to the rotation axis of the fan FN and parallel to the first surface M1 of the first substrate B1, the length of the fan FN is equal to or more than 0.8 times and less than 1 time the length of the first substrate B1. As a result, the head drive module 10 can suppress an increase in length in the main scanning direction depending on the size of the fan FN.

In addition, in the examples illustrated in FIGS. 11 to 13, the drive circuit section DRV, the fan FN, and the control circuit 100 are arranged in the order of the drive circuit section DRV, the fan FN, and the control circuit 100 in the second direction. Therefore, in this example, the fan FN is disposed in the first direction between the drive circuit section DRV and a connector (not illustrated) to which the cable through which the control signal is propagated from the second substrate B2 to the first substrate B1 is coupled. Therefore, the airflow created by the fan FN can cool each of the drive circuit section DRV, the fan FN, and the control circuit 100 without substantially decreasing the cooling efficiency. The drive circuit section DRV, the fan FN, and the control circuit 100 may be mounted on the first substrate B1 such that the drive circuit section DRV, the control circuit 100, and the fan FN are arranged in this order in the second direction. In this case, the fan FN is disposed between the fourth connector CN4 and the control circuit 100 in the first direction. Even in this case, the airflow created by the fan FN can cool each of the drive circuit section DRV, the fan FN, and the control circuit 100 without substantially decreasing the cooling efficiency. In addition, the drive circuit section DRV does not obstruct the airflow created by the fan FN. Therefore, the head drive module 10 can suppress sound generated by the airflow created by the fan FN.

In addition, in the examples illustrated in FIGS. 11 to 13, a length of a third object, which is the longest of the objects mounted on the first surface M1 of the first substrate B1 in the main scanning direction, is equal to or less than a length DS2 of the liquid discharge module 20 in the main scanning direction. Here, in this example, the third object is the second substrate B2, but may be another member mounted on the first substrate B1, such as the fan FN. In this case, the head drive module 10 can more reliably suppress an increase in size in the main scanning direction. That is, with the head drive module 10 having such a configuration, the liquid discharge apparatus 1 can more reliably suppress an increase in size in the main scanning direction. The length DS2 is represented by, for example, the length of the distribution flow path 37 in the main scanning direction, as illustrated in FIG. 17. As illustrated in FIG. 17, the length DS2 is a length in the main scanning direction of a portion with the longest length in the main scanning direction among portions of the distribution flow path 37.

In addition, in the examples illustrated in FIGS. 11 to 13, in the head drive module 10, the first connector CN1, the six drive circuit sections DRV, the fan FN, the conversion circuit 120, and the second connector CN2 are arranged in the order of the first connector CN1, the six drive circuit sections DRV, the fan FN, the conversion circuit 120, and the second connector CN2 in the second direction. Therefore, in the head drive module 10, the fan FN can cool the conversion circuit 120 together with the six drive circuit sections DRV. As a result, the head drive module 10 can improve the cooling efficiency of the six drive circuit sections DRV and the conversion circuit 120.

Figure 18:
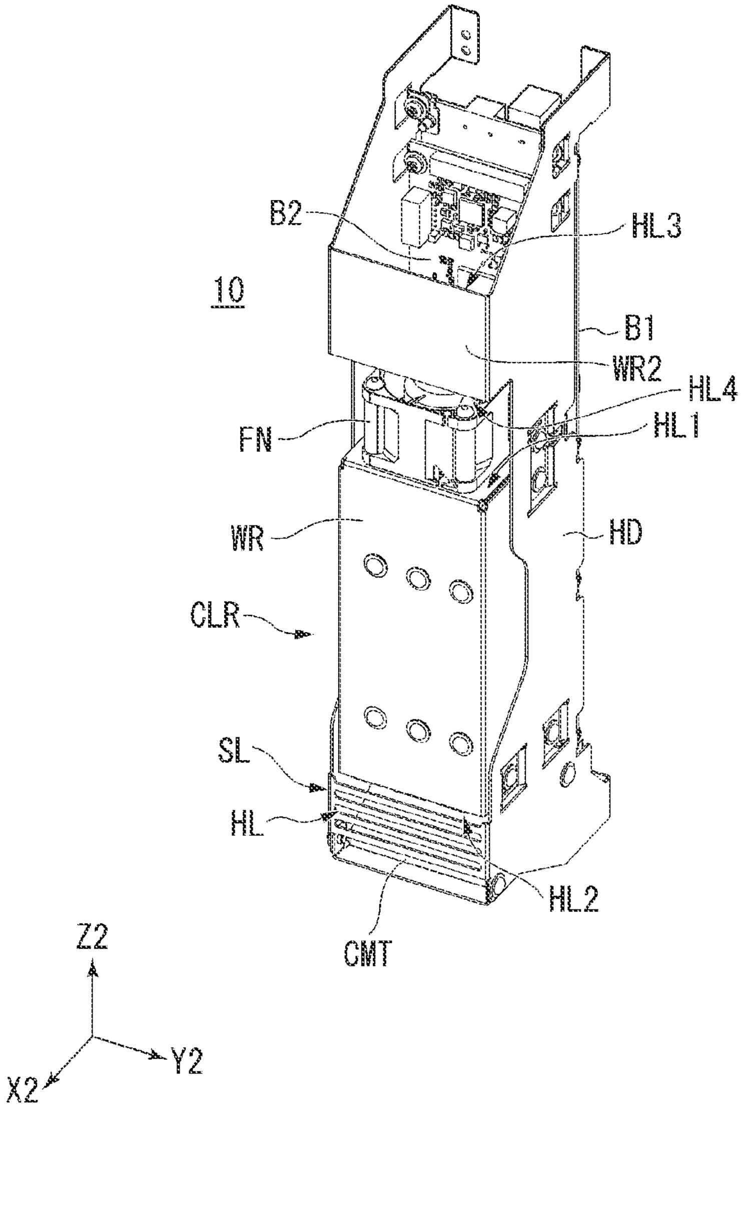
FIG. 18 is a diagram illustrating an example of a structure of the head drive module to which a cooling mechanism is attached.

As illustrated in FIG. 18, the head drive module 10 having the above-described structure may include a cooling mechanism CLR. FIG. 18 is a diagram illustrating an example of a structure of the head drive module 10 to which the cooling mechanism CLR is attached.

The cooling mechanism CLR includes an air guide portion WR, a second air guide portion WR2, a straightening plate CMT, and a frame HD.

The air guide portion WR is a member that guides the airflow created by the fan FN and covers the drive circuit section DRV on the first surface M1. Therefore, the air guide portion WR surrounds the third substrate B3 together with the first substrate B1 except for an upper opening HL1 and a lower opening HL2. The upper opening HL1 is an opening formed on the +Z2 side of a region surrounded by the air guide portion WR and the first substrate B1. Therefore, the upper opening HL1 is formed by the first substrate B1 and an end portion on the +Z2 side among end portions of the air guide portion WR. In addition, the lower opening HL2 is an opening formed on the −Z2 side of the region surrounded by the air guide portion WR and the first substrate B1. Therefore, the lower opening HL2 is formed by the first substrate B1 and an end portion on the −Z2 side among the end portions of the air guide portion WR. The air guide portion WR includes, for example, a third flat plate member, a fourth flat plate member, and a fifth flat plate member. The third flat plate member is a rectangular flat plate-shaped member parallel to the first surface M1 of the first substrate B1, and is a member separated from the first substrate B1. The fourth flat plate member is a rectangular flat plate-shaped member orthogonal to the first surface M1 of the first substrate B1, and is a member that extends from an end portion on the −Y2 side among end portions of the third flat plate member toward the first substrate B1 and abuts on the first substrate B1. The fifth flat plate member is a rectangular flat plate-shaped member orthogonal to the first surface M1 of the first substrate B1, and is a member that extends from an end portion on the +Y2 side among end portions of the third flat plate member toward the first substrate B1 and abuts on the first substrate B1. In the example illustrated in FIG. 18, the third flat plate member, the fourth flat plate member, and the fifth flat plate member are integrally configured as the air guide portion WR. That is, in this example, each of the third flat plate member, the fourth flat plate member, and the fifth flat plate member is formed by bending one rectangular flat plate-shaped metal plate. When the air guide portion WR includes the third flat plate member, the fourth flat plate member, and the fifth flat plate member, the above-described upper opening HL1 is formed by the first substrate B1 and end portions on the +Z2 side among end portions of each of the third flat plate member, the fourth flat plate member, and the fifth flat plate member. In addition, in this case, the lower opening HL2 is formed by the first substrate B1 and end portions on the −Z2 side among end portions of each of the third flat plate member, the fourth flat plate member, and the fifth flat plate member. A part or all of the third flat plate member, the fourth flat plate member, and the fifth flat plate member may be configured as separate bodies. In addition, one or both of the fourth flat plate member and the fifth flat plate member may be fixed by a fixing member such as a screw so as not to move relative to the first substrate B1. In this example, the air guide portion WR is fixed so as not to move relative to the frame HD described below. The fourth flat plate member may be separated from the first substrate B1. In this case, a gap between the fourth flat plate member and the first substrate B1 is closed by, for example, the frame HD. The fifth flat plate member may be separated from the first substrate B1. In this case, a gap between the fifth flat plate member and the first substrate B1 is closed by, for example, the frame HD.

Here, in the example illustrated in FIG. 18, the third flat plate member covers the entire six drive circuit sections DRV when the head drive module 10 is viewed in the direction opposite to the X2 direction. Therefore, in FIG. 18, the six drive circuit sections DRV are not visible. In this example, the fan FN, the upper opening HL1, the six drive circuit sections DRV, the lower opening HL2, and the first connector CN1 are arranged in the order of the fan FN, the upper opening HL1, the six drive circuit sections DRV, the lower opening HL2, and the first connector CN1 in the first direction. In this case, the third flat plate member may cover a part of the six drive circuit sections DRV, may cover a part or the whole of the fan FN together with the six drive circuit sections DRV, may cover a part or the whole of each of the fan FN and the control circuit 100 together with the six drive circuit sections DRV, and may cover a part or the whole of all the objects mounted on the first substrate B1. In this example, the third flat plate member covers the six drive circuit sections DRV, but does not cover the fan FN. In this example, the fan FN is disposed at the air inlet/outlet on the +Z2 side of the air guide portion WR. That is, in this example, the air guide portion WR is fixed to the frame HD such that the six drive circuit sections DRV are located in a space surrounded by the third flat plate member, the fourth flat plate member, the fifth flat plate member, and the first substrate B1, and the fan FN is located at the inlet/outlet on the +Z2 side in the space. The fan FN may be disposed to straddle both the space inside the air guide portion WR and the air inlet/outlet on the +Z2 side of the air guide portion WR. In addition, the fan FN may be disposed at an air inlet/outlet on the −Z2 side of the air guide portion WR.

The air guide portion WR having such a configuration does not include a member that obstructs the airflow in the second direction created by the fan FN. Therefore, as described above, the air guide portion WR guides the airflow created by the fan FN. In this example, the fan FN blows air so as to create the airflow flowing in the second direction. The airflow flowing in the second direction is wind from the lower opening HL2 to the upper opening HL1. In this case, the air guide portion WR guides the airflow created by the fan FN from the air inlet/outlet on the −Z2 side of the air guide portion WR toward the air inlet/outlet on the +Z2 side of the air guide portion WR. That is, in this case, the air guide portion WR guides the airflow created by the fan FN from the lower opening HL2 toward the upper opening HL1. When the fan FN blows air so as to create the airflow flowing in the first direction, the air guide portion WR guides the airflow created by the fan FN from the air inlet/outlet on the +Z2 side of the air guide portion WR toward the air inlet/outlet on the −Z2 side of the air guide portion WR. With the air guide portion WR, the head drive module 10 can improve the cooling efficiency of each of the six drive circuit sections DRV by the fan FN as a result of the airflow being guided in this way. When the fan FN creates the airflow flowing in the second direction as in this example, the lower opening HL2 is an example of a first port. In addition, in this case, the upper opening HL1 is an example of a second port. When the fan FN creates the airflow flowing in the first direction as in the other example described above, the upper opening HL1 is an example of a first port. In addition, in this case, the lower opening HL2 is an example of a second port.

The second air guide portion WR2 adjusts the wind between an end portion opposite to the first connector CN1 among end portions of the first substrate B1, and the fan FN. More specifically, the second air guide portion WR2 is a member that covers a space between the end portion and the fan FN together with the first substrate B1. Therefore, the second air guide portion WR2 surrounds the space between the end portion and the fan FN together with the first substrate B1 except for a second upper opening HL3 and a second lower opening HL4. The second upper opening HL3 is an opening formed on the +Z2 side of a region surrounded by the second air guide portion WR2 and the first substrate B1.

Therefore, the second upper opening HL3 is formed by the first substrate B1 and an end portion on the +Z2 side among end portions of the second air guide portion WR2. In addition, the second lower opening HL4 is an opening formed on the −Z2 side of the region surrounded by the second air guide portion WR2 and the first substrate B1. Therefore, the second lower opening HL4 is formed by the first substrate B1 and an end portion on the −Z2 side among end portions of the second air guide portion WR2. The second air guide portion WR2 includes, for example, a sixth flat plate member, a seventh flat plate member, and an eighth flat plate member. The sixth flat plate member is a rectangular flat plate-shaped member parallel to the first surface M1 of the first substrate B1, and is a member separated from the first substrate B1. The seventh flat plate member is a rectangular flat plate-shaped member orthogonal to the first surface M1 of the first substrate B1, and is a member that extends from an end portion on the −Y2 side among end portions of the sixth flat plate member toward the first substrate B1 and abuts on the first substrate B1. The eighth flat plate member is a rectangular flat plate-shaped member orthogonal to the first surface M1 of the first substrate B1, and is a member that extends from an end portion on the +Y2 side among end portions of the sixth flat plate member toward the first substrate B1 and abuts on the first substrate B1. In the example illustrated in FIG. 18, the sixth flat plate member, the seventh flat plate member, and the eighth flat plate member are integrally configured as the second air guide portion WR2. That is, in this example, each of the sixth flat plate member, the seventh flat plate member, and the eighth flat plate member is formed by bending one rectangular flat plate-shaped metal plate. When the second air guide portion WR2 includes the sixth flat plate member, the seventh flat plate member, and the eighth flat plate member, the above-described second upper opening HL3 is formed by the first substrate B1 and end portions on the +Z2 side among end portions of each of the sixth flat plate member, the seventh flat plate member, and the eighth flat plate member. In addition, in this case, the second lower opening HL4 is formed by the first substrate B1 and end portions on the −Z2 side among end portions of each of the sixth flat plate member, the seventh flat plate member, and the eighth flat plate member. A part or all of the sixth flat plate member, the seventh flat plate member, and the eighth flat plate member may be configured as separate bodies. In addition, one or both of the seventh flat plate member and the eighth flat plate member may be fixed by a fixing member such as a screw so as not to move relative to the first substrate B1. In this example, the second air guide portion WR2 is integrally configured with the frame HD described below. The seventh flat plate member may be separated from the first substrate B1. In this case, a gap between the seventh flat plate member and the first substrate B1 is closed by, for example, the frame HD. The eighth flat plate member may be separated from the first substrate B1. In this case, a gap between the eighth flat plate member and the first substrate B1 is closed by, for example, the frame HD.

Here, in the example illustrated in FIG. 18, the sixth flat plate member covers a part of the second substrate B2 when the head drive module 10 is viewed in the direction opposite to the X2 direction. Therefore, in FIG. 18, a part of the second substrate B2 is not visible. In this case, the sixth flat plate member may cover the entire second substrate B2. The second air guide portion WR2 may be integrally configured with the air guide portion WR.

The second air guide portion WR2 having such a configuration does not include a member that obstructs the airflow in the second direction created by the fan FN. Therefore, the second air guide portion WR2 guides the airflow created by the fan FN. In this example, the fan FN blows air so as to create the airflow flowing in the second direction. The airflow flowing in the second direction is wind from the second lower opening HL4 to the second upper opening HL3. In this case, the second air guide portion WR2 guides the airflow created by the fan FN from the air inlet/outlet on the −Z2 side of the second air guide portion WR2 toward the air inlet/outlet on the +Z2 side of the second air guide portion WR2. That is, the second air guide portion WR2 guides the airflow created by the fan FN from the second lower opening HL4 toward the second upper opening HL3. When the fan FN blows air so as to create the airflow flowing in the first direction, the second air guide portion WR2 guides the airflow created by the fan FN from the air inlet/outlet on the +Z2 side of the second air guide portion WR2 toward the air inlet/outlet on the −Z2 side of the second air guide portion WR2. That is, in this case, the second air guide portion WR2 guides the airflow created by the fan FN from the second lower opening HL4 toward the second upper opening HL3. With the second air guide portion WR2, the head drive module 10 can improve the cooling efficiency of the second substrate B2 by the fan FN as a result of the airflow being guided in this way.

When the fan FN, the upper opening HL1, the third substrate B3, the lower opening HL2, and the first connector CN1 are arranged in the order of the upper opening HL1, the third substrate B3, the lower opening HL2, the fan FN, and the first connector CN1 as the other example described above, the second air guide portion WR2 adjusts the wind between the end portion opposite to the first connector CN1 among the end portions of the first substrate B1, and the upper opening HL1. The second air guide portion WR2 may be referred to as a second straightening mechanism.

The straightening plate CMT is a plate-shaped member that intersects the first direction. The straightening plate CMT may be referred to as a first straightening mechanism. When the fan FN creates the airflow flowing in the second direction as in this example, the straightening plate CMT straightens, toward the second direction, the airflow flowing between the first surface M1 and the air guide portion WR from the air inlet/outlet on the −Z2 side of the air guide portion WR. In other words, in this case, the straightening plate CMT straightens, toward the second direction, the airflow flowing toward a direction intersecting the second direction. When the fan FN creates the airflow flowing in the first direction, the straightening plate CMT straightens, toward the direction intersecting the first direction, the airflow flowing out from between the first surface M1 and the air guide portion WR from the air inlet/outlet on the +Z2 side of the air guide portion WR.

A surface of the straightening plate CMT may be a flat surface, a curved surface, or a surface having irregularities. In the example illustrated in FIG. 18, the straightening plate CMT is a rectangular-shaped flat plate. In this example, the straightening plate CMT is fixed to the frame HD at the air inlet/outlet on the −Z2 side of the air guide portion WR such that an end portion on the −X2 side abuts on the first substrate B1 and the straightening plate CMT is inclined in the Z2 direction from an end portion on the +X2 side toward the end portion on the −X2 side. In other words, the straightening plate CMT is disposed between the liquid discharge module 20 and the six drive circuit sections DRV. In other words, the straightening plate CMT is disposed on the first direction side with respect to the six drive circuit sections DRV. In this case, a space interposed between the air guide portion WR and the straightening plate CMT is opened in the X2 direction. That is, the cooling mechanism CLR is formed with an intake port HL for supplying air flowing in the order of the straightening plate CMT and the air guide portion WR. The intake port HL is configured by the end portion on the +X2 side of the straightening plate CMT, an end portion on the −Z2 side of the third flat plate member constituting the air guide portion WR, and two plate-shaped members that hold the straightening plate CMT and the air guide portion WR so as to interpose the straightening plate CMT and the air guide portion WR between the −Y2 side and the +Y2 side among members constituting the frame HD. Therefore, the above-described air guide portion WR is disposed between the fan FN and the intake port HL. With such an intake port HL formed in the cooling mechanism CLR, the air guided to the air guide portion WR by the blowing of the fan FN is supplied from the intake port HL to the inside of the head drive module 10 in the direction opposite to the X2 direction, and is guided into the space inside the air guide portion WR by the straightening plate CMT. As a result, the head drive module 10 can suppress the influence of the airflow created by the fan FN on the discharge of the liquid from the liquid discharge module 20 while maintaining the air-cooling effect by the fan FN, compared to a case where an air is supplied from an end portion on the −Z2 side of the head drive module 10 to the inside of the head drive module 10. In other words, the head drive module 10 can suppress the displacement of the landing position of the liquid discharged from the liquid discharge module 20 due to the airflow created by the fan FN while maintaining the cooling effect of each of the drive circuit 52*a*, the drive circuit 52*b*, and the drive circuit 52*c* more than in this case. Furthermore, when the airflow flows in the second direction as in this example, the head drive module 10 can suppress the occurrence of a short circuit due to liquefaction of the ink mist. These effects are particularly remarkable when the head drive module 10 is coupled to the liquid discharge module 20 not via the wiring member 30. Here, when the head drive module 10 is coupled to the liquid discharge module 20 not via the wiring member 30, the head drive module 10 is B-to-B-coupled to the liquid discharge module 20. More specifically, in this case, the head drive module 10 is B-to-B-coupled directly above the liquid discharge module 20. When the head drive module 10 is coupled to the liquid discharge module 20 via the wiring member 30, the head drive module 10 is fixed such that the rotation axis of the fan FN is substantially parallel to the first direction and the head drive module 10 does not move with respect to the liquid discharge module 20. Such fixation of the head drive module 10 is performed by, for example, various jigs and fixing members. Note that even though the rotation axis of the fan FN is inclined by several degrees from the first direction, it is treated as being parallel to the first direction.

Here, in this example, the fan FN, the upper opening HL1, the third substrate B3, the lower opening HL2, and the first connector CN1 are arranged in the order of the fan FN, the upper opening HL1, the third substrate B3, the lower opening HL2, and the first connector CN1 in the first direction as in this example, and the fan FN creates the airflow toward the second direction. Therefore, the straightening plate CMT changes the direction of the wind from a direction approaching the first substrate B1 to a direction parallel to the first substrate B1 between the lower opening HL2 and the first connector CN1. When the fan FN, the upper opening HL1, the third substrate B3, the lower opening HL2, and the first connector CN1 are arranged in the order of the upper opening HL1, the third substrate B3, the lower opening HL2, the fan FN, and the first connector CN1 in the first direction, and when the fan FN creates the airflow toward the second direction, the straightening plate CMT changes the direction of the wind from a direction approaching the first substrate B1 to a direction parallel to the first substrate B1 between the fan FN and the first connector CN1. In addition, when the fan FN, the upper opening HL1, the third substrate B3, the lower opening HL2, and the first connector CN1 are arranged in the order of the fan FN, the upper opening HL1, the third substrate B3, the lower opening HL2, and the first connector CN1 in the first direction, and when the fan FN creates the airflow toward the first direction, the straightening plate CMT changes the direction of the wind from a direction substantially parallel to the first substrate B1 to a direction away from the first substrate B1 between the lower opening HL2 and the first connector CN1. In addition, when the fan FN, the upper opening HL1, the third substrate B3, the lower opening HL2, and the first connector CN1 are arranged in the order of the upper opening HL1, the third substrate B3, the lower opening HL2, the fan FN, and the first connector CN1 in the first direction, and when the fan FN creates the airflow toward the first direction, the straightening plate CMT changes the direction of the wind from the direction substantially parallel to the first substrate B1 to the direction away from the first substrate B1 between the fan FN and the first connector CN1.

In the example illustrated in FIG. 18, the intake port HL is provided with a slit SL. The slit SL is configured by a plurality of rectangular flat plate-shaped members that couple the two plate-shaped members that hold the straightening plate CMT and the air guide portion WR so as to interpose the straightening plate CMT and the air guide portion WR between the −Y2 side and the +Y2 side among the members constituting the frame HD. In other words, the slit SL is formed as a part of the frame HD. As a result, the head drive module 10 can suppress a decrease in strength of the frame HD due to the formation of the intake port HL. In addition, as a result, the head drive module 10 can suppress entrance of the ink mist into the inside of the head drive module 10. This effect is particularly remarkable when the head drive module 10 is coupled to the liquid discharge module 20 not via the wiring member 30.

Figure 19:
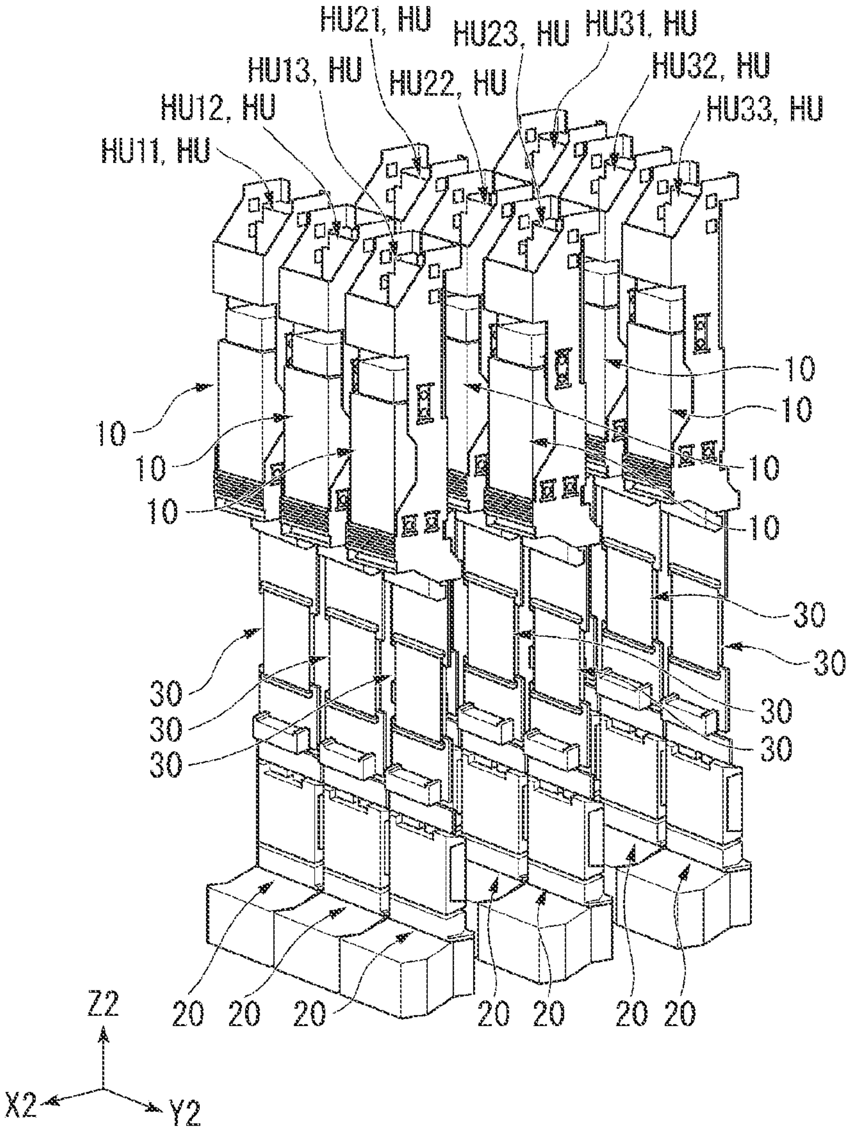
FIG. 19 is a diagram illustrating a plurality of head units configured as line heads in a liquid discharge apparatus.

The liquid discharge module 20 to which the head drive module 10 as described above is coupled constitutes a head unit HU in the liquid discharge apparatus 1 as illustrated in FIG. 19. That is, the liquid discharge apparatus 1 includes a plurality of the head units HU, where the liquid discharge module 20 to which the head drive module 10 is coupled is regarded as one head unit HU. In the liquid discharge apparatus 1, the plurality of head units HU form a line head. FIG. 19 is a diagram illustrating the plurality of head units HU configured as the line heads in the liquid discharge apparatus 1. In the example illustrated in FIG. 19, the head drive module 10 of each head unit HU is coupled to the liquid discharge module 20 via the wiring member 30. However, as described above, the head drive module 10 of each head unit HU may be B-to-B-coupled to the liquid discharge module 20 not via the wiring member 30.

In addition, in the example illustrated in FIG. 19, the head unit HU constitutes three line heads. Therefore, in the following, for convenience of description, three head units HU constituting the first line head will be referred to as a head unit HUH, a head unit HU12, and a head unit HU13, respectively. In addition, in the following, for convenience of description, three head units HU constituting the second line head will be referred to as a head unit HU21, a head unit HU22, and a head unit HU23, respectively. In addition, in the following, for convenience of description, three head units HU constituting the third line head will be referred to as a head unit HU31, a head unit HU32, and a head unit HU33, respectively.

The first line head is, for example, a line head configured by the head unit HUH to the head unit HUl3 including the liquid discharge module 20 that discharges a magenta liquid. The second line head is, for example, a line head configured by the head unit HU21 to the head unit HU23 including the liquid discharge module 20 that discharges a cyan liquid. The third line head is, for example, a line head configured by the head unit HU31 to the head unit HU33 including the liquid discharge module 20 that discharges a yellow liquid.

In the example illustrated in FIG. 19, the head unit HU11 to the head unit HU13 included in the first line head are arranged in the order of the head unit HUH, the head unit HU12, and the head unit HU13 in the Y2 direction. The head unit HU11 to the head unit HU13 included in the first line head may be arranged in a direction different from the Y2 direction. In this case, the direction in which the head unit HUH to the head unit HU13 included in the first line head are arranged is the direction parallel to the straightening plate CMT. In this case, the airflow passing through the intake port HL of each of the head unit HU11 to the head unit HU13 included in the first line head does not substantially affect the movement of the liquid discharged from the adjacent head unit HU. More specifically, the airflow passing through the intake port HL of the head unit HU11 does not substantially affect the movement of the liquid discharged from the adjacent head unit HU12. The airflow passing through the intake port HL of the head unit HU12 does not substantially affect the movement of the liquid discharged from each of the adjacent head unit HUH and head unit HUl3. The airflow passing through the intake port HL of the head unit HUl3 does not substantially affect the movement of the liquid discharged from the adjacent head unit HU12. That is, when the direction in which the head units HU included in the line head are arranged is the direction parallel to the straightening plate CMT, the liquid discharge apparatus 1 can more reliably suppress the displacement of the landing position of the liquid due to the airflow created by the fan FN in the line head. The above circumstance is the same for the second line head and the third line head. Therefore, in the following, the description of the direction in which the head units HU are arranged in each of the second line head and the third line head will be omitted.

The head unit HU11 to the head unit HUl3 included in the first line head may be arranged in the order of the head unit HUH, the head unit HU12, and the head unit HUl3 in a direction inclined from the Y2 direction. In this case, the head drive module 10 included in each of the head unit HU11 to the head unit HU13 includes, for example, the straightening plate CMT parallel to the direction in which the head unit HUH, the head unit HU12, and the head unit HUl3 are arranged. As a result, even in this case, the liquid discharge apparatus 1 can more reliably suppress the displacement of the landing position of the liquid due to the airflow created by the fan FN in the line head.

As described above, the drive circuit unit according to the embodiment is the drive circuit unit that drives the head including the discharge section discharging, based on the received drive signal, the liquid from the nozzle in the first direction, and includes the power supply board that supplies power to the drive circuit, and the fan mounted on the power supply board. As a result, the drive circuit unit can suppress an increase in size in the transport direction. In the example described above, the head drive module 10 is an example of the drive circuit unit. In addition, in the example described above, the nozzle opening portion of the discharge section 600 is an example of the nozzle. In addition, in the example described above, the gravity direction is an example of the first direction. In addition, in the example described above, the discharge section 600 is an example of the discharge section. In addition, in the example described above, the liquid discharge module 20 is an example of the head. In addition, in the example described above, each of the drive circuit 52*a*, the drive circuit 52*b*, and the drive circuit 52*c* is an example of the drive circuit. In addition, in the example described above, the first substrate B1 is an example of the power supply board. In addition, in the example described above, the fan FN is an example of the fan. In addition, in the example described above, the liquid discharge apparatus 1 is an example of the liquid discharge apparatus. The liquid discharge apparatus 1 is not limited to an apparatus that discharges a liquid by driving a piezoelectric element, and may be a liquid discharge apparatus of another system such as a so-called thermal system. Further, although the liquid discharge apparatus 1 is an apparatus that discharges the liquid by relatively moving the discharge unit 5 and the medium P, the discharge unit 5 may be moved without moving the medium P.

In addition, the drive circuit unit according to the embodiment is the drive circuit unit that drives the head including the discharge section discharging, based on the received drive signal, the liquid from the nozzle in the first direction, is B-to-B-coupled to the head, and includes the drive circuit that generates the drive signal, and the cooling mechanism that cools the drive circuit, in which the cooling mechanism includes the air guide portion that guides the airflow created by the fan and covers the drive circuit, and the straightening plate intersecting the first direction, and straightening plate is disposed between the head and the drive circuit. As a result, the drive circuit unit can suppress the displacement of the landing position of the liquid due to the airflow created by the fan while maintaining the cooling effect of the drive circuit. In the example described above, the head drive module 10 is an example of the drive circuit unit. In addition, in the example described above, the nozzle opening portion of the discharge section 600 is an example of the nozzle. In addition, in the example described above, the gravity direction is an example of the first direction. In addition, in the example described above, the discharge section 600 is an example of the discharge section. In addition, in the example described above, the liquid discharge module 20 is an example of the head. In addition, in the example described above, each of the drive circuit 52*a*, the drive circuit 52*b*, and the drive circuit 52*c* is an example of the drive circuit. In addition, in the example described above, the cooling mechanism CLR is an example of the cooling mechanism. In addition, in the example described above, the fan FN is an example of the fan. In addition, in the example described above, the air guide portion WR is an example of the air guide portion. In addition, in the example described above, the straightening plate CMT is an example of the straightening plate.

In addition, the drive circuit unit according to the embodiment is the drive circuit unit that is coupled to a head connector located opposite to a discharge port of the head, and includes the first substrate having the first connector coupled to the head connector, the third substrate on which the drive circuit generating the drive signal is mounted, and the fan that generates the wind, in which the drive signal is supplied from the third substrate to the first connector via the first substrate, the third substrate is B-to-B-coupled to the first substrate and stands upright with respect to the first substrate, the fan stands upright with respect to the first substrate, and the rotation axis of the fan is substantially parallel to the surface of the third substrate. As a result, the drive circuit unit can efficiently cool the drive circuit while suppressing the increase in size. In the example described above, the head drive module 10 is an example of the drive circuit unit. In addition, in the example described above, the liquid discharge module 20 is an example of the head. In addition, in the example described above, the nozzle opening portion of the discharge section 600 is an example of the discharge port. In addition, in the example described above, the coupling portion 330 is an example of the head connector. In addition, in the example described above, the first connector CN1 is an example of the first connector. In addition, in the example described above, the first substrate B1 is an example of the first substrate. In addition, in the example described above, each of the drive circuit 52*a*, the drive circuit 52*b*, and the drive circuit 52*c* is an example of the drive circuit. In addition, in the example described above, the third substrate B3 is an example of the third substrate. In addition, in the example described above, the fan FN is an example of the fan.

In addition, the drive circuit unit according to the embodiment is the drive circuit unit that generates the drive signal for driving the head, and includes the first connector coupled to the head, the drive circuit that generates the drive signal, the fan that generates the wind for the drive circuit, and the conversion circuit that converts the control signal for controlling the head, in which the first connector, the drive circuit, the fan, and the conversion circuit are arranged in the order of the first connector, the drive circuit, the fan, and the conversion circuit. As a result, the drive circuit unit can efficiently cool the drive circuit while suppressing the increase in size. In the example described above, the head drive module 10 is an example of the drive circuit unit. In addition, in the example described above, the liquid discharge module 20 is an example of the head. In addition, in the example described above, the first connector CN1 is an example of the first connector. In addition, in the example described above, each of the drive circuit 52*a*, the drive circuit 52*b*, and the drive circuit 52*c* is an example of the drive circuit. In addition, in the example described above, the fan FN is an example of the fan. In addition, in the example described above, the conversion circuit 120 is an example of the conversion circuit.

In addition, the drive circuit unit according to the embodiment is the drive circuit unit that generates the drive signal for driving the head, and includes the drive circuit that generates the drive signal, the first connector coupled to the head, the first substrate on which the first connector is mounted, the fan that generates the wind for the drive circuit, and the second substrate on which the fan is mounted. As a result, the drive circuit unit can suppress the transmission of the vibration generated by the rotation of the fan to the drive circuit. In the example described above, the head drive module 10 is an example of the drive circuit unit. In addition, in the example described above, the liquid discharge module 20 is an example of the head. In addition, in the example described above, each of the drive circuit 52*a*, the drive circuit 52*b*, and the drive circuit 52*c* is an example of the drive circuit. In addition, in the example described above, the first connector CN1 is an example of the first connector. In addition, in the example described above, the first substrate B1 is an example of the first substrate. In addition, in the example described above, the fan FN is an example of the fan. In addition, in the example described above, the second substrate B2 is an example of the second substrate. In addition, the first connector CN1, the second connector CN2, the third connector CN3, and the fourth connector CN4 may be straight-angle connectors instead of the right-angle connectors. When the first connector CN1 is a straight-angle connector, the first connector CN1 may be coupled from the side to a portion of the liquid discharge module 20 projecting on the Z2 side.

The items described above may be combined in any way.

APPENDIX 1

[1]

A drive circuit unit that drives a head including a discharge section discharging, based on a drive signal, a liquid from a nozzle in a first direction, the drive circuit unit including: a fan; and a power supply board disposed on a side in a second direction opposite to the first direction with respect to the head, supplying power to a drive circuit generating the drive signal, and having a first surface on which the fan is mounted, in which a height of a first object, which is a highest of objects mounted on the first surface in a direction orthogonal to the first surface, is equal to or less than a length of the head in a transport direction, and the first surface is a surface parallel to the first direction or a surface oblique to the first direction.

[2]

The drive circuit unit according to [1], in which the first object is the fan.

[3]

The drive circuit unit according to [1] or [2], in which the first object is a drive circuit section including the drive circuit.

[4]

The drive circuit unit according to any one of [1] to [3], in which a sum of the height of the first object and a height of a second object, which is a highest of objects mounted on a second surface of the power supply board in a direction orthogonal to the second surface, is equal to or less than the length of the head in the transport direction.

[5]

The drive circuit unit according to any one of [1] to [4], in which the fan blows air so as to create an airflow flowing in the second direction.

[6]

The drive circuit unit according to any one of [1] to [4], in which a rotation axis of the fan is parallel to the first direction.

[7]

The drive circuit unit according to any one of [1] to [6], further including: a plurality of drive circuit sections each including the drive circuit, in which the first surface is a surface parallel to the first direction, and when the drive circuit unit is viewed in the first direction, the fan is included within an outline of an imaginary region surrounding the plurality of drive circuit sections to have a minimum area.

[8]

The drive circuit unit according to any one of [1] to [7], further including: a control circuit generating a control signal, in which the drive circuit generates the drive signal based on the control signal generated by the control circuit, and the drive circuit, the fan, and the control circuit are arranged in an order of the drive circuit, the fan, and the control circuit, or in an order of the drive circuit, the control circuit, and the fan, in the second direction.

[9]

The drive circuit unit according to [8], in which the drive circuit, the fan, and the control circuit are arranged in the order of the drive circuit, the fan, and the control circuit in the second direction, and the fan is disposed between the drive circuit and a connector to which a cable through which the control signal is propagated is coupled in the first direction.

[10]

A head unit including: a head including a discharge section discharging, based on a drive signal, a liquid from a nozzle in a first direction; and a drive circuit unit driving the head, in which the drive circuit unit includes a fan, and a power supply board disposed on a side in a second direction opposite to the first direction with respect to the head, supplying power to a drive circuit generating the drive signal, and having a first surface on which the fan is mounted, and the first surface is a surface parallel to the first direction or a surface oblique to the first direction.

A liquid discharge apparatus including: a transport unit transporting a medium; a head including a discharge section discharging, based on a drive signal, a liquid from a nozzle in a first direction; and a drive circuit unit driving the head, in which the drive circuit unit includes a fan, and a power supply board disposed on a side in a second direction opposite to the first direction with respect to the head, supplying power to a drive circuit generating the drive signal, and having a first surface on which the fan is mounted, and the first surface is a surface parallel to the first direction or a surface oblique to the first direction.

APPENDIX 2

[1]

A drive circuit unit that drives a head including a discharge section discharging, based on a drive signal, a liquid from a nozzle in a first direction, the drive circuit unit including: a power supply board extending in a second direction opposite to the first direction and B-to-B-coupled to the head; a drive circuit mounted on a first surface of the power supply board and generating the drive signal; and a cooling mechanism cooling the drive circuit, in which the cooling mechanism includes an air guide portion guiding an airflow created by a fan and covering the drive circuit on the first surface, and a straightening plate that intersects the first direction and straightens, toward the second direction, the airflow flowing toward a direction intersecting the second direction, or that straightens the airflow flowing out from between the first surface and the air guide portion toward a direction intersecting the first direction, and the straightening plate is disposed on a first direction side with respect to the drive circuit.

[2]

The drive circuit unit according to [1], in which the cooling mechanism is formed with an intake port for supplying air flowing in an order of the straightening plate and the air guide portion.

[3]

The drive circuit unit according to [2], in which the intake port is provided with a slit.

[4]

The drive circuit unit according to any one of [1] to [3], in which the cooling mechanism includes the fan, and the fan is disposed at at least one of a space between the first surface and the air guide portion and an air inlet/outlet of the air guide portion.

[5]

The drive circuit unit according to [4], in which the fan blows air so as to create an airflow flowing in the first direction.

[6]

The drive circuit unit according to [4], in which the fan blows air so as to create an airflow flowing in the second direction.

[7]

The drive circuit unit according to any one of [4] to [6], further including: a control circuit generating a control signal, in which the drive circuit generates the drive signal based on the control signal generated by the control circuit, and the drive circuit, the fan, and the control circuit are arranged in an order of the drive circuit, the fan, and the control circuit, or in an order of the drive circuit, the control circuit, and the fan, in the second direction.

[8]

The drive circuit unit according to [2] or [3], in which the cooling mechanism includes the fan, and the air guide portion is disposed between the fan and the intake port.

[9]

The drive circuit unit according to [8], in which the fan blows air so as to create an airflow flowing in the first direction.

[10]

The drive circuit unit according to [8], in which the fan blows air so as to create an airflow flowing in the second direction.

[11]

The drive circuit unit according to any one of [8] to [10], further including: a control circuit generating a control signal, in which the drive circuit generates the drive signal based on the control signal generated by the control circuit, and the drive circuit, the fan, and the control circuit are arranged in an order of the drive circuit, the fan, and the control circuit, or in an order of the drive circuit, the control circuit, and the fan, in the second direction.

[12]

A head unit including: a head including a discharge section discharging, based on a drive signal, a liquid from a nozzle in a first direction; and a drive circuit unit driving the head, in which the drive circuit unit includes a power supply board extending in a second direction opposite to the first direction and B-to-B-coupled to the head, a drive circuit mounted on a first surface of the power supply board and generating the drive signal, and a cooling mechanism cooling the drive circuit, the cooling mechanism includes an air guide portion guiding an airflow created by a fan and covering the drive circuit on the first surface, and a straightening plate that intersects the first direction and straightens, toward the second direction, the airflow flowing toward a direction intersecting the second direction, or that straightens the airflow flowing out from between the first surface and the air guide portion toward a direction intersecting the first direction, and the straightening plate is disposed on a first direction side with respect to the drive circuit.

[13]

A liquid discharge apparatus including: a transport unit transporting a medium; a head including a discharge section discharging, based on a drive signal, a liquid from a nozzle in a first direction; and a drive circuit unit driving the head, in which the drive circuit unit includes a power supply board extending in a second direction opposite to the first direction and B-to-B-coupled to the head, a drive circuit mounted on a first surface of the power supply board and generating the drive signal, and a cooling mechanism cooling the drive circuit, the cooling mechanism includes an air guide portion guiding an airflow created by a fan and covering the drive circuit on the first surface, and a straightening plate that intersects the first direction and straightens, toward the second direction, the airflow flowing toward a direction intersecting the second direction, or that straightens the airflow flowing out from between the first surface and the air guide portion toward a direction intersecting the first direction, and the straightening plate is disposed on a first direction side with respect to the drive circuit.

[14]

The liquid discharge apparatus according to [13], in which the head and the drive circuit unit constitute a head unit, the liquid discharge apparatus includes at least two head units as a first head unit and a second head unit, the first head unit and the second head unit are arranged in a third direction, and the third direction is a direction parallel to the straightening plate.

APPENDIX 3

[1]

A drive circuit unit that is coupled to a head connector located opposite to a discharge port of a head, the drive circuit unit including: a first substrate having a first connector coupled to the head connector; a third substrate on which a drive circuit generating a drive signal is mounted; and a fan that generates wind, in which the drive signal is supplied from the third substrate to the first connector via the first substrate, the third substrate is B-to-B-coupled to the first substrate and stands upright with respect to the first substrate, the fan stands upright with respect to the first substrate, and a rotation axis of the fan is substantially parallel to a surface of the third substrate.

[2]

The drive circuit unit according to [1], further including: a first cover, in which the first substrate and the first cover surround the third substrate except for a first port and a second port, and the fan generates wind from the first port to the second port.

[3]

The drive circuit unit according to [2], in which the fan, the first port, the third substrate, the second port, and the first connector are arranged in an order of the fan, the first port, the third substrate, the second port, and the first connector.

[4]

The drive circuit unit according to [3], further including: a first straightening mechanism that changes a direction of the wind from a direction substantially parallel to the first substrate to a direction away from the first substrate between the second port and the first connector.

[5]

The drive circuit unit according to [4], further including: a second straightening mechanism that adjusts the wind between an end portion opposite to the first connector among end portions of the first substrate, and the fan.

[6]

The drive circuit unit according to [2], in which the fan, the first port, the third substrate, the second port, and the first connector are arranged in an order of the first port, the third substrate, the second port, the fan, and the first connector.

[7]

The drive circuit unit according to [6], further including: a first straightening mechanism that changes a direction of the wind from a direction substantially parallel to the first substrate to a direction away from the first substrate between the fan and the first connector.

[8]

The drive circuit unit according to [7], further including: a second straightening mechanism that adjusts the wind between an end portion opposite to the first connector among end portions of the first substrate, and the first port.

[9]

The drive circuit unit according to [2], in which the fan, the first port, the third substrate, the second port, and the first connector are arranged in an order of the fan, the second port, the third substrate, the first port, and the first connector.

[10]

The drive circuit unit according to [9], further including: a first straightening mechanism that changes a direction of the wind from a direction approaching to the first substrate to a direction substantially parallel to the first substrate between the first port and the first connector.

[11]

The drive circuit unit according to [10], further including: a second straightening mechanism that adjusts the wind between an end portion opposite to the first connector among end portions of the first substrate, and the fan.

[12]

The drive circuit unit according to [2], in which the fan, the first port, the third substrate, the second port, and the first connector are arranged in an order of the second port, the third substrate, the first port, the fan, and the first connector.

[13]

The drive circuit unit according to [12], further including: a first straightening mechanism that changes a direction of the wind from a direction approaching to the first substrate to a direction substantially parallel to the first substrate between the fan and the first connector.

[14]

The drive circuit unit according to [13], further including: a second straightening mechanism that adjusts the wind between an end portion opposite to the first connector among end portions of the first substrate, and the second port.

[15]

The drive circuit unit according to any one of [1] to [14], in which, when the fan is viewed in a direction orthogonal to the first substrate, the fan is included within an outline of the first substrate.

[16]

The drive circuit unit according to [15], in which, in a direction orthogonal to the rotation axis of the fan and parallel to a surface of the first substrate, a length of the fan is equal to or more than 0.8 times and less than 1 time a length of the first substrate.

[17]

The drive circuit unit according to or [16], in which a plurality of the third substrates are provided, and the drive circuits of the third substrates are all accommodated within a range in which the fan is projected in a rotation axis direction of the fan.

[18]

The drive circuit unit according to any one of [1] to [17], in which the third substrate is mounted with a capacitor on a first substrate side with respect to the drive circuit.

[19]

The drive circuit unit according to [18], in which the third substrate is mounted with all electronic components taller than the drive circuit on the first substrate side with respect to the drive circuit.

[20]

The drive circuit unit according to any one of [1] to [19], in which all couplings between the third substrate and other substrates are via a B-to-B coupling to the first substrate.

[21]

A head unit including: a head including a discharge port and a head connector located opposite to the discharge port; and a drive circuit unit coupled to the head connector, in which the drive circuit unit includes a first substrate having a first connector coupled to the head connector, a third substrate on which a drive circuit generating a drive signal is mounted, and a fan that generates wind, the drive signal is supplied from the third substrate to the first connector via the first substrate, the third substrate is B-to-B-coupled to the first substrate and stands upright with respect to the first substrate, the fan stands upright with respect to the first substrate, and a rotation axis of the fan is substantially parallel to a surface of the third substrate.

[22]

A liquid discharge apparatus including: a transport unit transporting a medium; a head including a discharge port and a head connector located opposite to the discharge port; and a drive circuit unit coupled to the head connector, in which the drive circuit unit includes a first substrate having a first connector coupled to the head connector, a third substrate on which a drive circuit generating a drive signal is mounted, and a fan that generates wind, the drive signal is supplied from the third substrate to the first connector via the first substrate, the third substrate is B-to-B-coupled to the first substrate and stands upright with respect to the first substrate, the fan stands upright with respect to the first substrate, and a rotation axis of the fan is substantially parallel to a surface of the third substrate.

APPENDIX 4

[1]

A drive circuit unit that generates a drive signal for driving a head, the drive circuit unit including: a first connector coupled to the head; a drive circuit that generates the drive signal; a fan that generates wind for the drive circuit; and a conversion circuit that converts a control signal for controlling the head, in which the first connector, the drive circuit, the fan, and the conversion circuit are arranged in an order of the first connector, the drive circuit, the fan, and the conversion circuit.

[2]

The drive circuit unit according to [1], further including: a fourth connector that receives the control signal input to the conversion circuit, in which the first connector, the drive circuit, the fan, the conversion circuit, and the fourth connector are arranged in an order of the first connector, the drive circuit, the fan, the conversion circuit, and the fourth connector.

[3]

The drive circuit unit according to [1] or [2], further including: a first substrate on which the first connector is mounted; and a second substrate on which the conversion circuit is mounted, in which the first substrate and the second substrate are B-to-B-coupled.

[4]

The drive circuit unit according to [3], in which the second substrate is mounted with a fourth connector that receives the control signal input to the conversion circuit, the conversion circuit operates by power supplied from the first substrate to the second substrate, and the control signal is received by the fourth connector not via the first substrate.

[5]

The drive circuit unit according to [4], in which the second substrate is mounted with the fan, and the fan operates by the power supplied from the first substrate to the second substrate.

[6]

The drive circuit unit according to [5], in which the fan has fins that rotate around a rotation axis of the fan, and a height of a heat sink of the conversion circuit is shorter than a radius of a cylindrical region swept by the rotation of the fins.

[7]

A head unit including: a head; and a drive circuit unit that generates a drive signal for driving the head, in which the drive circuit unit includes a first connector coupled to the head, a drive circuit that generates the drive signal, a fan that generates wind for the drive circuit, and a conversion circuit that converts a control signal for controlling the head, and the first connector, the drive circuit, the fan, and the conversion circuit are arranged in an order of the first connector, the drive circuit, the fan, and the conversion circuit.

[8]

A liquid discharge apparatus including: a transport unit transporting a medium; a head; and a drive circuit unit that generates a drive signal for driving the head, in which the drive circuit unit includes a first connector coupled to the head, a drive circuit that generates the drive signal, a fan that generates wind for the drive circuit, and a conversion circuit that converts a control signal for controlling the head, and the first connector, the drive circuit, the fan, and the conversion circuit are arranged in an order of the first connector, the drive circuit, the fan, and the conversion circuit.

APPENDIX 5

[1]

A drive circuit unit that generates a drive signal for driving a head, the drive circuit unit including: a drive circuit that generates the drive signal; a first connector coupled to the head; a first substrate on which the first connector is mounted; a fan that generates wind for the drive circuit; and a second substrate on which the fan is mounted.

[2]

The drive circuit unit according to [1], in which the fan protrudes from the second substrate to a drive circuit side.

[3]

The drive circuit unit according to [1] or [2], in which the fan operates by power supplied by a cable from the first substrate not via the second substrate.

[4]

The drive circuit unit according to any one of [1] to [3], in which the first substrate and the second substrate are B-to-B-coupled via a floating connector.

[5]

The drive circuit unit according to any one of [1] to [4], in which the fan is mounted on the second substrate via a floating connector.

[6]

The drive circuit unit according to [5], in which the fan is fixed to the second substrate only by the floating connector between the fan and the second substrate.

[7]

The drive circuit unit according to any one of [1] to [6], in which the second substrate includes a right-angle connector to which a communication cable is coupled, on an end portion opposite to the fan among end portions of the second substrate.

[8]

A head unit including: a head; and a drive circuit unit that generates a drive signal for driving the head, in which the drive circuit unit includes a drive circuit that generates the drive signal, a first connector coupled to the head, a first substrate on which the first connector is mounted, a fan that generates wind for the drive circuit, and a second substrate on which the fan is mounted.

[9]

A liquid discharge apparatus including: a transport unit transporting a medium; a head; and a drive circuit unit that generates a drive signal for driving the head, in which the drive circuit unit includes a drive circuit that generates the drive signal, a first connector coupled to the head, a first substrate on which the first connector is mounted, a fan that generates wind for the drive circuit, and a second substrate on which the fan is mounted.

The embodiment of the present disclosure is described above in detail with reference to the drawings. However, the specific configuration is not limited to this embodiment, and may be changed, replaced, deleted, or the like without departing from the gist of the present disclosure.

What is claimed is:

1. A drive circuit unit generating a drive signal for driving a head, the drive circuit unit comprising:
a drive circuit generating the drive signal;
a first connector connectable to the head;
a first substrate on which the first connector is mounted;
a fan generating wind for the drive circuit; and
a second substrate on which the fan is mounted, and
the first substrate and the second substrate being B-to-B-coupled via a floating connector.

2. The drive circuit unit according to claim 1, wherein the fan protrudes from the second substrate to a drive circuit side.

3. The drive circuit unit according to claim 1, wherein the fan operates by power supplied by a cable from the first substrate not via the second substrate.

4. The drive circuit unit according to claim 1, wherein the fan is mounted on the second substrate via a floating connector.

5. The drive circuit unit according to claim 4, wherein the fan is fixed to the second substrate only by the floating connector between the fan and the second substrate.

6. The drive circuit unit according to claim 1, wherein the second substrate includes a right-angle connector to which a communication cable is coupled, on an end portion opposite to the fan among end portions of the second substrate.

7. A head unit comprising:
a head; and
a drive circuit unit generating a drive signal for driving the head, wherein
the drive circuit unit includes
a drive circuit generating the drive signal,
a first connector coupled to the head,
a first substrate on which the first connector is mounted,
a fan generating wind for the drive circuit, and
a second substrate on which the fan is mounted, and
the first substrate and the second substrate being B-to-B-coupled via a floating connector.

8. A liquid discharge apparatus comprising:
a transport unit transporting a medium;
a head; and
a drive circuit unit generating a drive signal for driving the head, wherein
the drive circuit unit includes
a drive circuit generating the drive signal,
a first connector coupled to the head,
a first substrate on which the first connector is mounted,
a fan generating wind for the drive circuit, and
a second substrate on which the fan is mounted, and
the first substrate and the second substrate being B-to-B-coupled via a floating connector.

* * * * *